(12) United States Patent
Rope et al.

(10) Patent No.: US 9,582,566 B2
(45) Date of Patent: *Feb. 28, 2017

(54) CONDENSING HIERARCHICAL DATA

(71) Applicant: International Business Machines Corporation, Armonk, NY (US)

(72) Inventors: Daniel J. Rope, Reston, VA (US); Jing-Yun Shyr, Naperville, IL (US); Damir Spisic, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 83 days.

This patent is subject to a terminal disclaimer.

(21) Appl. No.: 14/309,448

(22) Filed: Jun. 19, 2014

(65) Prior Publication Data

US 2015/0186500 A1 Jul. 2, 2015

Related U.S. Application Data

(63) Continuation of application No. 14/142,062, filed on Dec. 27, 2013, now Pat. No. 9,460,402.

(51) Int. Cl.
*G06F 17/30* (2006.01)
*G06Q 10/10* (2012.01)

(52) U.S. Cl.
CPC .. *G06F 17/30601* (2013.01); *G06F 17/30592* (2013.01); *G06Q 10/10* (2013.01)

(58) Field of Classification Search
USPC .......... 707/607, 609, 687, 790, 813
See application file for complete search history.

(56) References Cited

U.S. PATENT DOCUMENTS

| 6,304,260 | B1 | 10/2001 | Wills |
| 6,963,339 | B2 | 11/2005 | Leah et al. |
| 7,003,490 | B1 | 2/2006 | Keyes |
| 8,122,404 | B2 | 2/2012 | Sinha et al. |

(Continued)

FOREIGN PATENT DOCUMENTS

| JP | 2005085166 A | 3/2005 |
| JP | 2006338099 A | 12/2006 |

OTHER PUBLICATIONS

International Search Report and Written Opinion of international application No. PCT/JP2014/005411, mailed Nov. 18, 2014, 7 pp.

(Continued)

*Primary Examiner* — Sana Al Hashemi
(74) *Attorney, Agent, or Firm* — Shumaker & Sieffert, P.A.

(57) ABSTRACT

A computing device includes at least one processor, and at least one module operable by the at least one processor to receive data representing a hierarchy, wherein the hierarchy comprises at least one set of sibling nodes and a respective parent node, generate a condensed hierarchy by determining a grouping for the at least one set of sibling nodes, determine whether the at least one set of sibling nodes can be represented by the respective parent node, based at least in part on the grouping for the at least one set of sibling nodes, and responsive to determining that the at least one set of sibling nodes can be represented by the respective parent node, remove the at least one set of sibling nodes from the condensed hierarchy. The at least one module may further be operable by the at least one processor to output the condensed hierarchy for display.

14 Claims, 7 Drawing Sheets

(56) References Cited

U.S. PATENT DOCUMENTS

| | | | |
|---|---|---|---|
| 8,640,055 B1* | 1/2014 | Dunning | G06F 3/0482 715/853 |
| 2006/0082592 A1 | 4/2006 | Black-Ziegelbein et al. | |
| 2006/0241034 A1 | 10/2006 | Chauvier et al. | |
| 2007/0161548 A1 | 7/2007 | Gack et al. | |
| 2007/0185904 A1 | 8/2007 | Matsuzawa et al. | |
| 2008/0120346 A1 | 5/2008 | Neogi et al. | |
| 2008/0259815 A1* | 10/2008 | Gorman | H04L 41/00 370/254 |
| 2009/0013287 A1 | 1/2009 | Helfman et al. | |
| 2009/0053290 A1 | 2/2009 | Sand et al. | |
| 2010/0169853 A1* | 7/2010 | Jain | G06F 17/5022 716/104 |
| 2012/0296900 A1 | 11/2012 | Kalai et al. | |

OTHER PUBLICATIONS

Burnham et al., FW663-Lecture 5, "Information Theory and Log-Likelihood Models: A Basis for Model Selection and Inference", retrieved from warnercnr.colostate.edu/~gwhite/fw663/modelsel. pdf, published 2002, 16 pp.

"Why Minimize Negative Log Likelihood?," retrieved from http://quantivity.wordpress.com/2011/05/23/why-minimize-negative-log-likelihood/, published May 23, 2011, 3 pp.

"Kullback-Leibler divergence," Wikipedia, retreived from http://en.wikipedia.org/wiki/Kullback%E2%80%93Leibler_divergence on Apr. 26, 2013, 14 pp.

Hurvich et al., "Regression and Time Series Model Selection in Small Samples," Biometrika, vol. 76, No. 2, Jun. 1989, 12 pp.

Chintalapani, "Temporal Treemaps for Visualizing Time Series Data," University of Maryland Master of Science Thesis, 2004, 118 pp.

"Akaike information criterion", Wikipedia, retreived from http://en.wikipedia.org/wiki/Akaike_information_criterion on Apr. 26, 2013, 5 pp.

Elmqvist et al., "Hierarchical Aggregation of Information Visualization: Overview, Techniques and Design Guidelines," IEEE Transactions on Visualization and Computer Graphics, vol. 16, No. 3, May/Jun. 2010, 16 pp.

Rosenbaum et al.,"Progressive Representation of Large Hierarchies Using Treemaps," ISVC '09 Proceedings of the 5th International Symposium on Advances in Visual Computing: Part II, 2009, 10 pp.

Yan, "Regression Trees and Nonlinear Time Series Modeling," Doctor of Philosophy Dissertation, University of Wisconsin-Madison, May 4, 1995, 163 pp.

U.S. Appl. No. 14/142,062, filed Dec. 27, 2013 entitled "Condensing Hierarchical Data."

Preliminary Amendment from U.S. Appl. No. 14/142,062, filed Jun. 19, 2014.

Office Action from U.S. Appl. No. 14/142,062, dated Oct. 1, 2015, 8 pp.

Response to the Office Action mailed Oct. 1, 2015, from U.S Appl. No. 14/142,062, filed Jan. 4, 2016, 9 pp.

Final Office Action from U.S. Appl. No. 14/142,062, dated Feb. 24, 2016, 9 pp.

Advisory Action from U.S. Appl. No. 14/142,062, dated May 3, 2016, 2 pp.

Response to the Final Office Action mailed Feb. 24, 2016 and the Advisory Action dated May 3, 2016, from U.S. Appl. No. 14/142,062, filed May 24, 2016, 9 pp.

Notice of Allowance from U.S. Appl. No. 14/142,062, mailed Jun. 21, 2016, 5 pgs.

International Preliminary Report on Patentability from International Application No. PCT/JP2014/005411, mailed Jul. 7, 2016, 5 pgs.

* cited by examiner

CONDENSING HIERARCHICAL DATA

This application is a Continuation of U.S. application Ser. No. 14/142,062, filed on Dec. 27, 2013 entitled CONDENSING HIERARCHICAL DATA, the entire content of which is incorporated herein by reference.

FIELD OF INVENTION

The disclosure relates to data representation and visualization in computing systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Often these complex systems make use of multidimensional data sources that organize and manipulate the tremendous volume of data using data structures referred to as data cubes. A data cube may, for example, include a plurality of hierarchical dimensions having levels and members for storing the multidimensional data. Once data has been entered, a user may wish to view some or all of the data in a coherent manner by generating a report. The system may perform mathematical calculations on the data, combining data submitted by many users. Using the results of these calculations, the system may generate reports for review by higher management.

Reporting and analysis end user products (typically referred to as Business Intelligence, or BI, tools) allow users to author reports and perform data exploration and analysis on a myriad of data sources, such as multi-dimensional data structures, relational databases, flat files, Extensible Markup Language ("XML") data, data streams, and unorganized text and data. Business intelligence tools may be used to prepare and aggregate individual reports and analyses by executing queries on underlying data sources, and to present those reports and analyses in a user-accessible format.

SUMMARY

In one example, a method includes receiving data representing a hierarchy, wherein the hierarchy comprises at least one set of sibling nodes and a respective parent node, and generating, by a computing system comprising at least one processor, a condensed hierarchy, wherein generating the condensed hierarchy includes determining a grouping for the at least one set of sibling nodes, determining, based at least in part on the grouping for the at least one set of sibling nodes, whether the at least one set of sibling nodes can be represented by the respective parent node, and responsive to determining that the at least one set of sibling nodes can be represented by the respective parent node, removing the at least one set of sibling nodes from the condensed hierarchy. The method further includes outputting, by the computing system, the condensed hierarchy for display.

In another example, a computing device includes at least one processor, a query module operable by the at least one processor to receive data representing a hierarchy, wherein the hierarchy comprises at least one set of sibling nodes and a respective parent node, and a hierarchy condensation module operable by the at least one processor to generate a condensed hierarchy by determining a grouping for the at least one set of sibling nodes, determine whether the at least one set of sibling nodes can be represented by the respective parent node, based at least in part on the grouping for the at least one set of sibling nodes, and responsive to determining that the at least one set of sibling nodes can be represented by the respective parent node, remove the at least one set of sibling nodes from the condensed hierarchy. The computing device further includes a user interface module operable by the at least one processor to output the condensed hierarchy for display.

In another example, a computer program product includes a computer-readable storage medium having program code embodied therewith, the program code executable by a computing device comprising at least one processor to perform a method comprising receiving data representing a hierarchy, wherein the hierarchy comprises at least one set of sibling nodes and a respective parent node and generating a condensed hierarchy, wherein generating the condensed hierarchy comprises determining a grouping for the at least one set of sibling nodes, determining whether the at least one set of sibling nodes can be represented by the respective parent node, based at least in part on the grouping for the at least one set of sibling nodes, responsive to determining that the at least one set of sibling nodes can be represented by the respective parent node, removing the at least one set of sibling nodes from the condensed hierarchy, and outputting the condensed hierarchy for display.

The details of one or more examples are set forth in the accompanying drawings and the description below. Other features will be apparent from the description and drawings, and from the claims.

DETAILED DESCRIPTION

Figure 1:
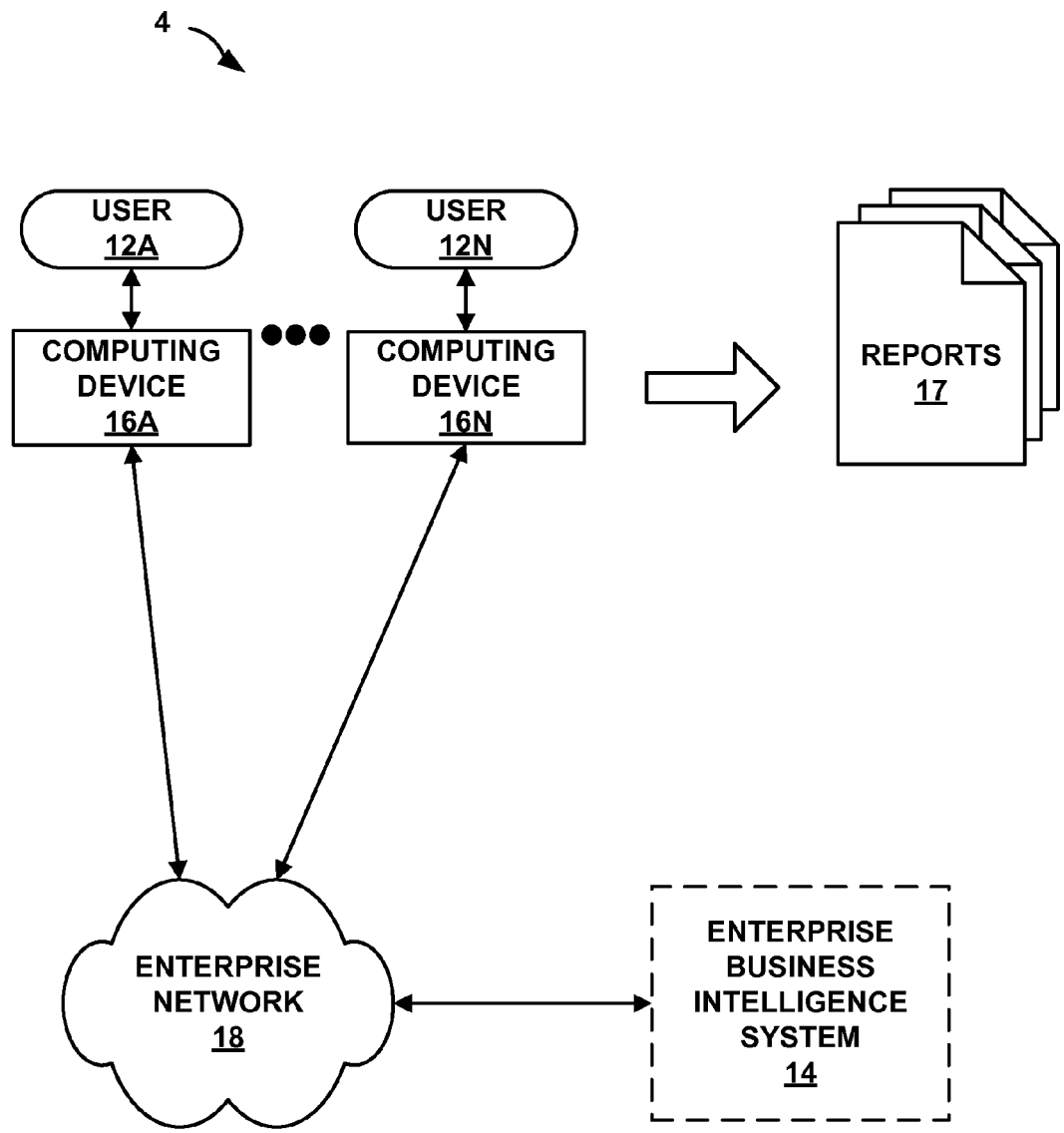
FIG. 1 is a block diagram illustrating an example computing environment in which a plurality of users interact with an enterprise business intelligence system, in accordance with one or more aspects of the present disclosure.

Techniques are described for simplifying reports that include hierarchical data, such as treemaps, by consolidating and/or summarizing the hierarchical data into statistically meaningful groupings and summaries. The techniques may, for example, provide hardware, firmware, software, or some combination thereof operable to condense data in a hierarchical structure while minimizing the loss of information. In some examples, the techniques may provide a graphical user interface (GUI) that enables a user to display the condensed hierarchy data while avoiding a threshold level of information loss. That is, techniques of the present disclosure may enable a computing device or computing system to create and display reports of hierarchical data in a way that allows users to more easily understand and consume the data while ensuring minimal loss of detail.

For exemplary purposes, various examples of the techniques of this disclosure may be readily applied to various software systems executed by various devices, including enterprise business intelligence systems, other large-scale enterprise software systems, as well as single-user, stand-alone software applications. Examples of enterprise software systems include enterprise financial or budget planning systems, order management systems, inventory management systems, sales force management systems, business intelligence tools, enterprise reporting tools, project and resource management systems, and other enterprise software systems. Other example applications include spreadsheet applications, tax assessment software, or any environment where visualization of hierarchical data may be beneficial. For instance, techniques of this disclosure may be readily applied by user interfaces for viewing personal or business finances.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, a system, apparatus, or device used to store data, but does not include a computer readable signal medium. Such system, apparatus, or device may be of a type that includes, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates an example context in which techniques disclosed herein may be used. FIG. 1 is a block diagram illustrating an example enterprise 4 in which a plurality of users 12A-12N (collectively "users 12") may interact with an enterprise business intelligence system 14, in accordance with one or more aspects of the present disclosure. As shown in the example system of FIG. 1, enterprise business intelligence system 14 may be communicatively coupled to a number of computing devices 16A-16N (collectively "computing devices 16") by an enterprise network 18. Users 12 interact with their respective computing devices to access enterprise business intelligence system 14 and input, modify, and review data. In one example, users 12 may use computing devices 16 to access enterprise business intelligence system 14 and author one or more reports 17. Reports 17 may include business intelligence reports, such as sales reports, revenue reports, payroll reports, etc. Enterprise business intelligence system 14 may provide users 12 with functionality to create reports 17 including visualizations of hierarchical data. Users 12, computing devices 16A-16N, enterprise network 18, and enterprise business intelligence system 14 may all be either in a single facility or widely dispersed in two or more separate locations anywhere in the world, in different examples.

In the example of FIG. 1, typically, users 12 may use a user-configurable business intelligence user interface (UI) to view and manipulate data (e.g., generate reports 17) via their respective computing devices 16. This may include data from any of a wide variety of sources, including from multidimensional data structures and relational databases within enterprise 4, as well as data from a variety of external sources that may be accessible over a public network. Multidimensional data structures are "multidimensional" in that each multidimensional data element is defined by a plurality of different object types, where each object is associated with a different dimension. In some examples, Users 12 may, for example, retrieve data related to store sales by entering a name of a sales person, a store identifier, a date, a product, and a price at which the product was sold, into their respective computing devices 16.

Enterprise users 12 may use a variety of different types of computing devices 16 to run a business intelligence UI and to generate business intelligence reports 17 or otherwise interact with enterprise business intelligence system 14 via enterprise network 18. For example, an enterprise user 12 may run a business intelligence UI and interact with enterprise business intelligence system 14 using a laptop computer, desktop computer, or the like, running a web browser. Alternatively, an enterprise user may use a smartphone or similar device, running a business intelligence UI in either a web browser or a dedicated mobile application for interacting with enterprise business intelligence system 14. Further examples of computing devices 16 may include workstation computers, netbooks, tablet computers, E-readers, or any other such computing device. In either case, a business intelligence UI running on a user's computing device 16 may access various data sources from within enterprise business intelligence system 14, as well as any of a variety of external network resources and any of a variety of external data sources.

Enterprise network 18 may represent any communication network, such as a packet-based digital network like a private enterprise intranet or a public network like the Internet. In this manner, enterprise network 18 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

In some examples, the business intelligence UI running on computing devices 16 may use retrieved data to generate one or more reports 17 using the techniques described herein. In other examples, enterprise business intelligence system 14 may generate reports 17 and provide reports 17 to one or more of computing devices 16. That is, in some examples, techniques of the present disclosure may be performed by one or more devices or systems external to computing devices 16. Computing devices 16 may send indications of input to the remote devices, which perform techniques of the present disclosure, and receive data (e.g., reports 17) from the remote devices. In any case, one of users 12 (e.g., user 12A) may interact with one of computing device 16 (e.g., computing device 16A) to generate one or more of reports 17. Computing device 16A may receive input indicating the data to include in the report. For instance, user 12A may indicate a range of data elements and/or the dimensions to include in the report. Computing device 16A may access enterprise business intelligence system 14 or other sources to obtain the specified data.

In some examples, the specified data may be hierarchical data. Hierarchical data may include one or more measures associated with one or more dimensions that are organized in a hierarchy. That is, data elements may be labeled using various hierarchical dimensions. Data elements in one dimension may be based on a collection of data elements in other dimensions. For instance, revenue data elements may be labeled using a "state" dimension, a "county" dimension, and a "city" dimension. The state, county, and city dimensions may be defined in a hierarchy, such that each city is contained within a county and each county is contained within a state. Thus, the revenue values in the county dimension may each be a grouping of revenue values in the city dimension and revenue values in the state dimension may each be a grouping of revenue values in the county dimension. That is, in hierarchical data, data elements in a higher dimension may be a sum of data elements in a lower dimension, an average value of data elements in a lower dimension, a minimum or maximum data element in a lower dimension, or otherwise dependent upon data elements in a lower dimension.

Various types of visualizations may be used in reports 17 to depict hierarchical multidimensional data. For instance, the data may be shown in a chart or table or depicted in a tree structure. Each leaf node of the tree structure may correspond to one or more measures at the lowest dimension of the hierarchy. Each branch node up the tree structure may represent a subsequent dimension of the hierarchy, with a root node representing the entire hierarchy (e.g., all the data). As another example, hierarchical multidimensional data may be visualized using a treemap. Treemaps display hierarchical data as a set of nested shapes, such as rectangles. Each branch of the tree structure (e.g., a value within a dimension) may correspond to a rectangle, which is then tiled with smaller rectangles representing sub-branches lower in the hierarchy (e.g., data elements of lower dimensions). The area of each rectangle may be proportional to the value of the corresponding data element within the particular dimension.

Treemaps have become a common business tool for visualizing data that may have natural or implied hierarchies. Treemap visualizations may be useful for a rapid lookup of counts of particular nodes within a hierarchy that are at extremes (e.g., represented by size) as well as a lookup of continuous value measurements for a given node (e.g., represented by color). However, as the number of hierarchy levels and the number of nodes grow, the structure within the hierarchy may be increasingly difficult to portray and understand. Further, the placement of nodes within the treemap to optimize space constraints may not take similarity of node values into consideration.

When multiple hierarchical dimensions are included in reports 17, even when those dimensions each have only a few data elements, problems can occur with high level interpretation. For instance, a three level treemap visualization may include the style and brand of shoes sold in a sales area. The first level of the tree structure may indicate one of fourteen sales areas in which the sale occurred. The second level of the tree structure may indicate one of four brands of shoes that were sold. The third level of the tree structure may indicate one of four styles of shoe that was sold. Such a combination of fourteen states, four brands and four styles yields two hundred and twenty four nodes at the third level and two hundred ninety five nodes total in the hierarchy. In addition to reducing information recognition and understanding, such complicated treemaps may suffer from practical problems as well, such as label placement and nodes that are too small to be displayed.

Some hierarchical data may include one or more sets of sibling nodes (e.g. hierarchy members with a common direct parent node). The present disclosure may provide techniques to divide each such set of sibling nodes in a hierarchy into a set of disjoint groups (e.g., a grouping), where the siblings in each group have similar measure values. Each group of members may represent a unit with a single set of "pooled" summary statistics for the whole group. However, the labels of members in the group may still be retained for identification purposes. If all the siblings can be joined in a single group (e.g., the grouping consists of a single group having all the siblings), then the set of siblings may be removed from the hierarchy and the group is represented by its parent node.

Techniques of the present disclosure may improve user efficiency in working with business reporting and analysis by providing a method and system to generate and/or output, for display, consolidated hierarchical data with statistically meaningful groupings and summaries to simplify the structure of underlying hierarchical data. For example, a computing device may use the continuous value measurements for different nodes of an original hierarchy structure and reduce the original hierarchy to a smaller, condensed hierarchy structure. The condensed hierarchy may represent available measurements for all the existing nodes. The computing device may optimally select appropriate nodes to represent the whole hierarchy with a minimum loss of information, given the degree of hierarchy condensation. That is, the computing device may use one or more objective measurements (e.g., "risk") to determine how and how much to condense the original hierarchy. By using statistically meaningful criteria for the hierarchy condensation, techniques of the present disclosure may enable the computing device to determine a more intuitive condensed hierarchy than previous methods, such as reduction based on data filtering or presenting only select hierarchy levels. That is, the present disclosure may provide better techniques for minimizing information loss when condensing large hierarchies.

In addition, techniques of the present disclosure may enable a computing device to generate one or more of reports 17 that include condensed hierarchical data. For instance, the computing device may output information to display the condensed hierarchy as a treemap visualization. In some examples, the computing device may output the treemap visualization as part of a graphical user interface (GUI) for viewing and interacting with the displayed data. That is, computing devices or computing systems operating in accordance with techniques described herein may generate reports 17 that users 12 may change, modify or add to by providing input.

While described herein primarily with respect to treemaps, one or more techniques of the present disclosure also may be used in the context of various other visualizations for data, such as choropleth maps or any other visualization usable to depict data adhering to a tree structure. A choropleth map, in some examples, may be a thematic geographical map in which areas are shaded or patterned in proportion to a measurement of a statistical variable being displayed on the map, such as population density, per-capita income, or other characteristics about the area or people of the area. For instance, one or more techniques of the present disclosure may be applied to a choropleth map of the United States, indicating the voting disparity per county in a presidential election.

By condensing hierarchical data and outputting the condensed hierarchy for display, techniques of the present disclosure may enable a computing device to provide insightful information to users while easing information recognition and understanding. That is, displaying a condensed hierarchy (e.g., in a treemap) may enable users to quickly gain an understanding of important information while avoiding "information overload" from cluttered and/or confusing visualizations.

Figure 2:
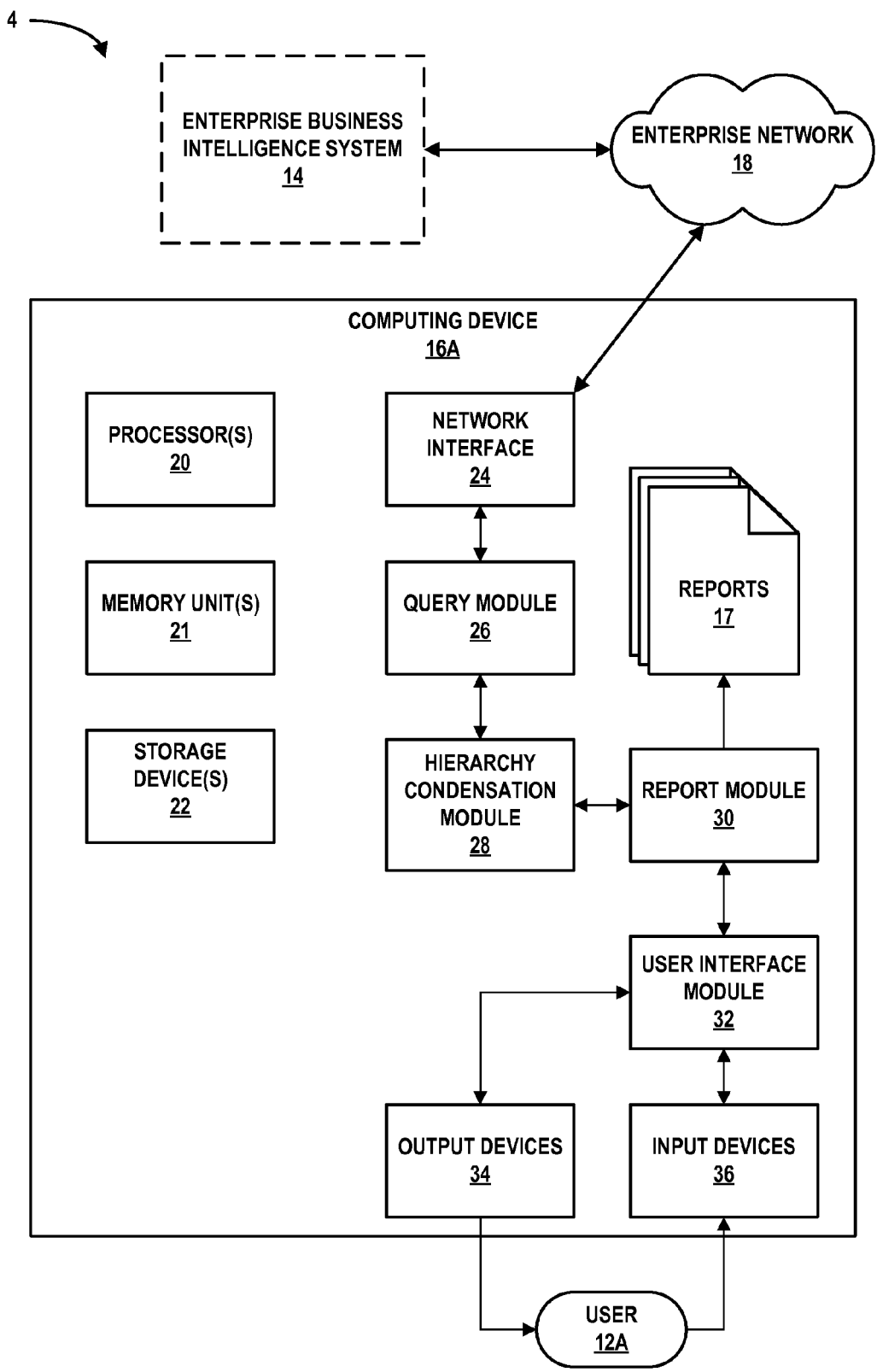
FIG. 2 is a block diagram illustrating one example of a computing device that may be used for interacting with the enterprise business intelligence system of FIG. 1, in accordance with one or more aspects of the present disclosure.

FIG. 2 is a block diagram illustrating one example of a computing device that may be used for interacting with the enterprise business intelligence system of FIG. 1, in accordance with one or more aspects of the present disclosure. Computing device 16A includes one or more processors 20, one or more memory units 21, and one or more storage devices 22. In addition, computing device 16A includes network interface 24, query module 26, hierarchy condensation module 28, report module 30, user interface (UI) module 32, one or more output devices 34, and one or more input devices 36. While shown as separate components in FIG. 2, operations performed by one or more of network interface 24, modules 26, 28, 30, and 32, and/or devices 34 and 36 may be performed by a single module or device, or other number of modules or devices in various examples. Additionally, in some examples, one or more components of computing device 16A, such as query module 26, hierarchy condensation module 28, and/or report module 30, may be part of enterprise business intelligence system 14 or other device of enterprise 4 (e.g., connected to enterprise network 18). That is, in some examples, techniques of the present disclosure may be performed by various devices of enterprise 4 and computing device 16A may communicate with one or more other devices via enterprise network 18 to send requests for data and/or receive generated output.

Computing device 16A, in the example of FIG. 2, includes one or more processors 20. Processors 20, in one example, are configured to implement functionality and/or process instructions for execution in computing device 16A. For example, processors 20 may be capable of executing instructions of various components of computing device 16A, such as modules 26, 28, 30 and 32. Examples of processors 20 may include, any one or more of a microprocessor, a controller, a digital signal processor (DSP), an application specific integrated circuit (ASIC), a field-programmable gate array (FPGA), or equivalent discrete or integrated logic circuitry.

In the example of FIG. 2, computing device 16A includes one or more memory units 21. Memory units 21 may be configured to store information in computing device 16A during operation. Memory units 21, in some examples, are a temporary memory, meaning that a primary purpose of memory units 21 is not long-term storage. In other examples, memory units 21 include one or more computer-readable storage media. Memory units 21, in some examples, are described as volatile memory, meaning that memory units 21 do not maintain stored contents when the computer is turned off. Examples of volatile memories include random access memories (RAM), dynamic random access memories (DRAM), static random access memories (SRAM), and other forms of volatile memories known in the art. In some examples, memory units 21 are used to store program instructions for execution by processors 20. Memory units 21, in one example, are used by software or applications running on computing device 16A (e.g., modules 26, 28, 30, and/or 32) to temporarily store information during program execution.

Computing device 16A, as shown in FIG. 2, includes one or more storage devices 22. In some examples, storage devices 22 include one or more computer-readable storage media. Storage devices 22 may be configured to store larger amounts of information than volatile memory. Storage devices 22 may further be configured for long-term storage of information. In some examples, storage devices 22 include non-volatile storage elements. Examples of non-volatile storage elements include magnetic hard discs, optical discs, floppy discs, flash memories, or forms of electrically programmable memories (EPROM) or electrically erasable and programmable memories (EEPROM). While shown as separate components in FIG. 2, memory units 21 may be one example of storage devices 22.

In some examples, memory units 21 and/or storage devices 22 may store or otherwise include one or more data cubes. Data cubes may store data from user 12A and/or from data sources of enterprise business intelligence system 14 via enterprise network 18. Data stored in the data cubes may provide the underlying hierarchical data for computing device 16A to generate condensed hierarchies and/or create reports 17. Data cubes, in some examples, may include two-dimensional databases and/or multidimensional databases (e.g., cubes). In some examples, dimensions of the data cubes may be defined in a hierarchical manner. Data cubes may be implemented using a variety of vendor platforms, and may be distributed throughout the enterprise via network interface 24. As one example, the data cubes may be multidimensional databases configured for Online Analytical Processing (OLAP). As another example, the data cubes may be multidimensional databases configured to receive and execute Multidimensional Expression (MDX) queries of some arbitrary level of complexity. As yet another example, the data cubes may be two-dimensional relational databases configured to receive and execute SQL queries, also with an arbitrary level of complexity. Storing the data cubes locally within memory units 21 and/or storage devices 22 may allow some or all calculation performed as part of condensing hierarchical data and generating reports 17 to be performed locally by computing device 16A. In other examples, computing device 16A may not store the data cubes locally, and one or more devices, such as enterprise business intelligence system 14 may perform the calculation.

As shown in the example of FIG. 2, computing device 16A includes UI module 32. UI module 32 may include instructions operable by processors 20 via memory units 21 to interact with output devices 34 and/or input devices 36 to provide an interface to user 12A enabling selection of various data elements from the multidimensional enterprise data and/or creation of one or more reports 17. That is, UI module 32 may display a GUI (e.g., at one or more of output devices 34) with which user 12A can interact (e.g., by using one or more of input devices 36) to cause computing device 16A to create or select report specifications, retrieve the requisite enterprise data, and/or generate reports 17.

UI module 32 may receive input from user 12A via one or more input devices 36. Input devices 36 may be part of computing device 16A, or may be communicatively coupled to computing device 16A. Input devices 36 may include a keyboard, a mouse, a touch-sensitive or presence-sensitive display, a stylus, or any device operable to provide machine input. UI module 32 may output information to user 12A via one or more of output devices 34. While shown in the example of FIG. 2 as part of computing device 16A, output devices 34 may, in other examples, be external to and/or operatively coupled to computing device 16A. Output devices 34, in some examples, are configured to provide output to a user using tactile, audio, or video stimuli. Output devices 34 may include a presence-sensitive display, a sound card, a video graphics adapter card, or any other type of device for converting a signal into an appropriate form understandable to humans or machines. Additional examples of output devices 34 include a speaker, a cathode ray tube (CRT) monitor, a liquid crystal display (LCD), or any other type of device that can generate intelligible output to a user.

In the example of FIG. 2, UI module 32 may receive input from user 12A (e.g., via input devices 36) indicating a request to generate one or more reports 17 for display (e.g., at output devices 34). UI module 32 may provide the request to one or more other components of computing device 16A.

As shown in the example of FIG. 2, computing device 16A includes report module 30. Report module 30 may include instructions operable by processors 20 via memory units 21 to generate reports 17 based on report specifications. Report specifications may be one or more documents used by computing device 16A (e.g., stored on storage devices 22) that provide the structure and content of reports 17. In some examples, report specifications may include documents or files containing markup language (e.g., XML) instructions that define various criteria for a report. That is, report specifications may be configurations of data (e.g., input data) to be included in a report. For instance, a report specification may define the type and layout of various objects (e.g., charts and tables) to be displayed in a report. Report specifications may include one or more definitions that specify which data element or elements are to be included or used to generate the objects of reports 17. The definitions may be created in a query language, (e.g., SQL), and may be executable by components of computing device 16A to cause retrieval of the defined data elements from underlying data sources.

In the example of FIG. 2, report module 30 may receive the inputted request from UI module 32. The request may include an indication of a report specification to use in order to generate one of reports 17. The request may also include an indication of the underlying data to include in the report. That is, data received from UI module 32 may specify the format of a report as well as the data to include in the report. In the example of FIG. 2, report module 30 may receive a request to generate a report that includes a treemap visualization of particular sales data for enterprise 4. For instance, the request may indicate that the treemap visualization should include revenue data for a particular range of sales areas, a particular range of product brands, and a particular range of product styles. Responsive to receiving the data, report module 30 may cause one or more other components of computing device 16A to retrieve the relevant enterprise data.

Computing device 16A, in the example of FIG. 2, includes query module 26. Query module 26 may include instructions operable by processors 20 via memory units 21 to generate queries used to obtain data from enterprise business intelligence system 14 via enterprise network 18. For instance, query module 26 may receive an indication (e.g., from report module 30 or other components) of specific data elements to be retrieved from within multidimensional data of enterprise 4. In some examples, query module 26 may generate one or more queries to retrieve relevant data from locally stored data cubes. In other examples, query module 26 may retrieve the relevant data from data cubes of enterprise business intelligence system 14. In yet other examples, query module 26 may obtain the relevant data from a combination of sources.

Computing device 16A, in the example of FIG. 2, includes network interface 24. Network interface 24 may provide functionality to communicate with external devices, such as enterprise business intelligence system 14, via one or more networks (e.g., enterprise network 18). Network interface 24 may include a network interface card, such as an Ethernet card, an optical transceiver, a radio frequency transceiver, or any other type of device that can send and receive information. Other examples of such network interfaces may include 3G and WiFi radio components, as well as Universal Serial Bus (USB). In some examples, computing device 16A utilizes network interface 24 to communicate with enterprise business intelligence system 14 when sending or receiving multidimensional data, such as when retrieving data for reports 17. In the example of FIG. 2, query module 26 may communicate with network interface 24 and cause network interface 24 to send one or more queries to enterprise business intelligence system 14 in order to obtain the relevant revenue and sales volume information. Responsive to sending the queries, network interface 24 may receive enterprise data (e.g., data specified by the queries) via enterprise network 18. Network interface 24 may provide the received data to query module 26. Query module 26 may send the data received from network interface 24 to one or more other components of computing device 16A.

As shown in the example of FIG. 2, computing device 16A includes hierarchy condensation module 28. Hierarchy condensation module 28 may be operable by processors 20 via memory units 21 to receive enterprise data, determine a hierarchical representation of the enterprise data, condense the hierarchical representation to obtain a condensed hierarchy, and/or output the condensed hierarchy to report module 30 for display as part of reports 17. In this way, hierarchy condensation module 28 may enable computing device 16A to display hierarchically defined enterprise data that is potentially more easily understood and absorbed by users.

In the example of FIG. 2, hierarchy condensation module 28 may receive enterprise data from query module 26. Responsive to receiving the enterprise data, hierarchy condensation module 28 may determine whether the enterprise data is hierarchical data. That is, hierarchy condensation module 28 may determine whether the enterprise data is, or can be, defined within a hierarchical structure. Hierarchy condensation module 28 may determine whether the data is hierarchical based on report specifications, based on the enterprise data itself, based on user input, and/or based on other factors. Definitions for hierarchical dimensions—or collectively, a defined hierarchy—may include a set of dimensions or attributes, such as Day, Month, Quarter, and Year, and a set of parent-child relationships among the members of the set, such as an indication that Years are made up of Quarters, Quarters are made up of Months, and Months are made up of Days. A hierarchy may be defined in a report specification, defined within the structure of the data itself, or defined in some other fashion. For instance, the hierarchy may be defined in each hierarchical dimension of the data. Each value specified at the top dimension, Year, may be defined as the parent to four values of another dimension, Quarter. Quarter values belonging to different Year parents are always distinct, although they may have the same labels (e.g., every Year value has a First Quarter value). In some examples, labels within a hierarchical dimension may differ among different parents. For instance, in a hierarchy defined by dimensions City and State and the relationship that States are made up of Cities, the city names in different states may be different.

In some examples, the received enterprise data may not be hierarchical. That is, hierarchy condensation module 28 may determine that dimensions of the enterprise data are not in a defined hierarchy. Responsive to determining that the data is not hierarchical data, hierarchy condensation module 28 may provide the enterprise data to report module 30 and/or perform one or more other functions unrelated to the present disclosure. In other examples, hierarchy condensation module 28 may determine that the received enterprise data contains two or more dimensions that are defined in a hierarchy. Responsive to determining that the enterprise data is hierarchical data, hierarchy condensation module 28 may process the hierarchical data to create a condensed hierarchy, in accordance with the techniques of the present disclosure.

In some examples, hierarchy condensation module 28 may group one or more members of the hierarchy. Grouping of hierarchy members (e.g., nodes) may decrease the size of the hierarchy but may also introduce loss of information. Techniques of the present disclosure may enable a computing device to condense a hierarchy to an acceptable size while optimizing an objective criterion relevant to the loss of information.

Measure values of a hierarchy may be represented by their mean or sum for each hierarchy member. In examples where measure values represent a mean value, the error due to condensing the hierarchical data can be measured by a risk function defined as the averaged squared error loss for the measured values. The squared error loss contributed from all the leaf members of the original hierarchy is called the hierarchy risk. Risk can also be defined for any condensed hierarchy. Risk is the lowest for the original hierarchy and it increases for any hierarchy condensation. Determining the potential risk change that would result from any operation performed on the hierarchy allows evaluation of the risk increase against the size of the hierarchy condensation.

An acceptable risk increase, a desired hierarchy size, or other criteria can be used to identify a suitable hierarchy condensation. This can be followed by an interactive user search for an alternative condensation in the constructed sequence of hierarchy condensations.

In the example of FIG. 2, the dimensions of the enterprise data may inherently define a hierarchy for the various data elements. For instance, revenue values may be broken down by sales location, brand, and style. Revenue values of the location dimension may be defined as a sum of relevant values of the brand dimension. Values for the brand dimension of the elements may be defined as a sum of relevant values of the style dimension. Hierarchy condensation module 28 may determine that the enterprise data is hierarchical data based on the inherent definition. Responsive to determining that the data is hierarchical, hierarchy condensation module 28 may condense and/or summarize at least a part of the hierarchal dimensions by generating a condensed hierarchy.

In some examples, in order to condense hierarchical data, hierarchy condensation module 28 may create a hierarchical model (e.g., a tree structure) to represent the hierarchical data. In the example of FIG. 2, for instance, hierarchy condensation module 28 may create a tree structure having four levels of nodes to represent the three dimensions. The first level may contain a single node (e.g., the root node), representing the total revenue of all sales. The second level may contain nodes, each a child of the root node, representing the revenue values for each location. The third level may contain nodes, each a child of a node from the second level, representing the revenue values for each brand within the respective location. Finally, the fourth level of the tree structure may contain nodes, each a child of a node from the third level, representing the revenue values for each style within the respective brand within the respective location. In other examples, enterprise data may already be in an acceptable format for hierarchy condensation. That is, in some examples, data received from query module 26 may be in a tree structure or other suitable structure.

Hierarchy condensation module 28 may use the created tree structure (e.g., an original hierarchy) to create a condensed hierarchy that represents the underlying data, and output the condensed hierarchy for use in reports 17. That is, hierarchy condensation module 28 may enable computing device 16A to condense and summarize hierarchical dimensions prior to generating a visualization, such as a treemap visualization, for a report. Condensing a hierarchy may include performing various operations on the hierarchy, such as determining groupings for a set sibling nodes (e.g., those nodes having a same parent node), summarizing a set of sibling nodes in a parent node (e.g., removing the set of sibling nodes), or other operations. That is, two or more nodes at the same hierarchy level that have a common parent may be grouped according to the nodes' corresponding measure values and a node at any level of a hierarchy can be summarized based on the continuous measure values for all of the node's child nodes. By performing at least one operation on the hierarchy, hierarchy condensation module 28 may create a condensed hierarchy.

Hierarchy condensation module 28 may perform operations on the hierarchy to condense the hierarchy until a stopping criterion is encountered. A stopping criterion, in various examples, represents an indication that the hierarchy has been sufficiently condensed. In some examples, the stopping criterion may be defined by the user, or contained within the report specification for a given report. In other examples, hierarchy condensation module 28 may use a predefined stopping criterion, or may automatically determine the stopping criterion (e.g., based on the hierarchical data to be condensed). Once hierarchy condensation module 28 encounters a stopping criterion, hierarchy condensation module 28 may output the condensed hierarchy to one or more other components of computing device 16A (e.g., report module 30).

Report module 30 may receive the condensed hierarchy from condensation module 28 and generate reports 17. Report module 30 may generate one or more of reports 17 based on the report specification received as part of the request. In the example of FIG. 2, report module 30 outputs reports 17 locally at computing device 16A. That is, report module 30 may send data to UI module 32 causing UI module 32 to display reports 17 at one or more of output devices 34. In other examples, report module 30 may output reports 17 to enterprise business intelligence system 14, or to others of computing devices 16 via network interface 24.

By condensing hierarchical data and using a condensed hierarchy to generate reports, hierarchy condensation module 28 may enable computing device 16A to provide users with treemaps, choropleth maps, and other visualizations of enterprise data that are easier to process and understand while maintaining important details or distinctions present in the enterprise data. That is, by condensing hierarchical data, computing device 16A may be able to efficiently reduce large amounts of hierarchical data to smaller, more easily managed hierarchies. Generating treemaps, choropleth maps, or other visualizations based on condensed hierarchical data may enable computing device 16A to provide an easy way for users to obtain and understand important distinctions and values within the hierarchical data while potentially reducing the amount of superfluous or unimportant information present in the visualization.

Figure 3:
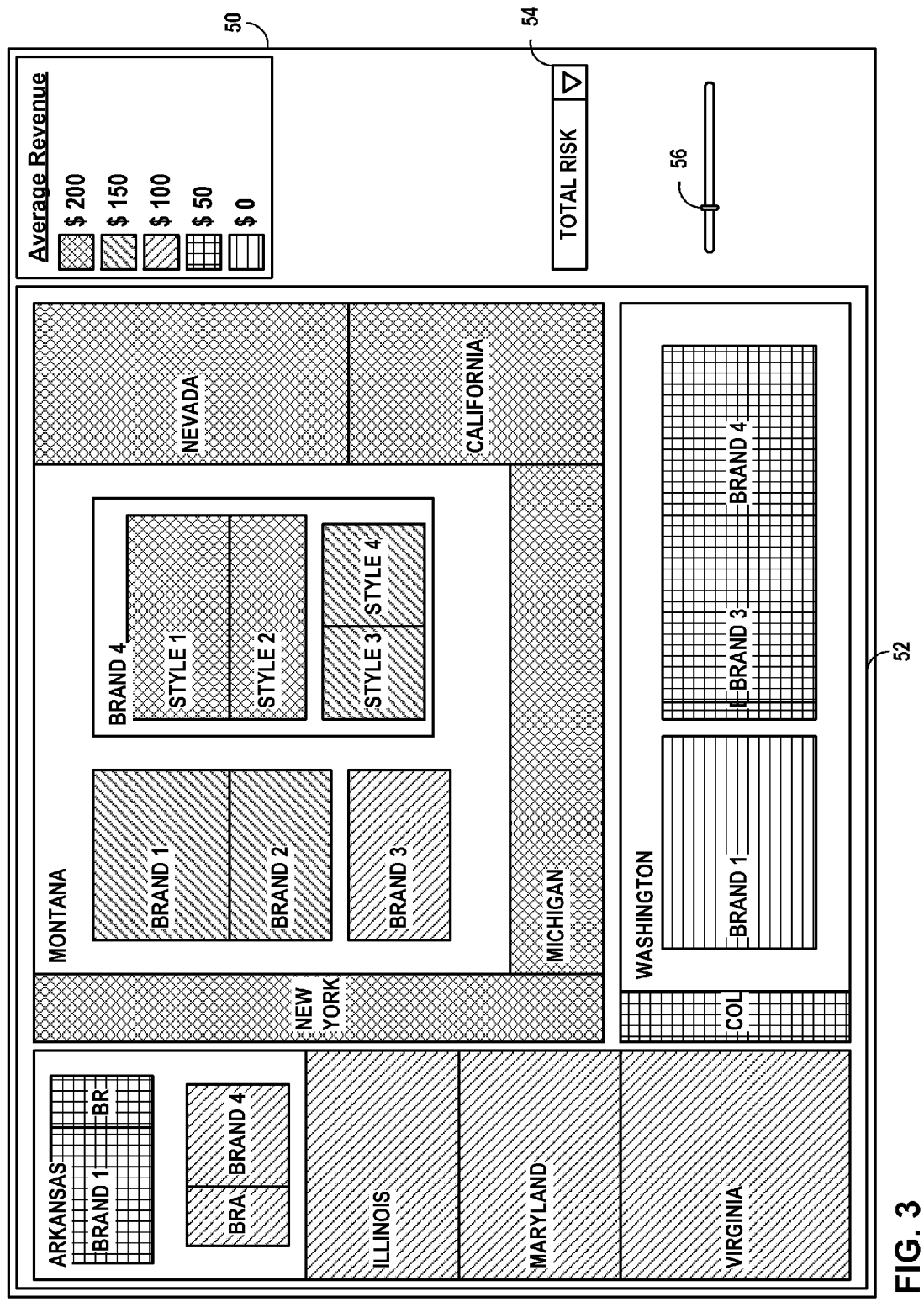
FIG. 3 is a block diagram illustrating an example GUI displaying a treemap visualization, in accordance with one or more aspects of the present disclosure.

FIG. 3 is a block diagram illustrating an example GUI 50 displaying a treemap visualization 52, in accordance with one or more aspects of the present disclosure. For purposes of illustration, the example shown in FIG. 3 is described in the context of computing device 16A and enterprise business intelligence system 14 as shown in FIGS. 1 and 2. GUI 50 may be displayed by UI module 32 at one or more of output devices 34 of computing device 16A. As shown in the example of FIG. 3, GUI 50 includes treemap visualization 52, criterion selector 54, and threshold slider 56.

Treemap visualization 52 may be a visualization of a condensed hierarchy outputted by hierarchy condensation module 28. One or more components of computing device 16A may have received a request for one of reports 17 and retrieved the data specified in the request from enterprise business intelligence system 14 and/or storage devices 22. The retrieved data, in the example of FIG. 3, may include three dimensions of revenue data, corresponding to geographical locations associated with the revenue values, brands associated with the revenue values, and styles associated with the revenue values. Specifically, the retrieved data may correspond to revenue values in 11 different states (e.g., of the United States), for four brands of products (e.g., Brand 1, Brand 2, Brand 3, and Brand 4), and for four styles of each brand of products (e.g., Style 1, Style 2, Style 3, and Style 4).

Hierarchy condensation module 28 may receive the data, and determine (e.g., based on the way the data is defined) that the retrieved data is hierarchical data. In accordance with the techniques of the present disclosure, hierarchy condensation module 28 may create a tree structure to represent the hierarchical data. That is, hierarchy condensation module 28 may create a hierarchy (e.g., an original hierarchy) from the retrieved data, based on the defined relationships within the data.

The original hierarchy created by hierarchy condensation module 28 may contain a root node in a first level of the hierarchy having 11 child nodes in a second level of the hierarchy. Each child of the root node may represent an average of all revenue values (e.g., measures) for a specific state in the state dimension of the data. In the example of FIG. 3, the state dimension may include average revenues for Arkansas, Illinois, Maryland, Virginia, New York, Colorado, Washington, Michigan, Montana, Nevada, and California. Each node in the second level of the hierarchy may, in turn, have four child nodes in a third level of the hierarchy. Each of the child nodes in the third level of the hierarchy may represent an average of revenue values for one of the four brands of product within the parent state. Finally, each node in the third level of the hierarchy may have four child nodes in a fourth level of the hierarchy. Each child node in the fourth level of the hierarchy may represent an average of revenue values for one of the four styles of product for the parent brand within the grandparent state. That is, each node representing a state may have four child nodes each representing a respective brand within that state. Each brand node may have four child nodes each representing a respective style within that brand within that state. Thus, the original hierarchy, in the example of FIG. 3, contains a root node, 11 nodes representing the states, 44 nodes representing the brands, and 176 nodes representing the styles for a total of 232 nodes.

In accordance with one or more techniques of the present disclosure, hierarchy condensation module 28 may condense the original hierarchy. The degree of condensation of a hierarchy may be controlled by a risk function that is used to quantify the loss of information that may result from performing an operation on a hierarchy. The risk function to be used for a report may be user-specified, defined within a report specification, predefined by hierarchy condensation module 28, or otherwise determined. Examples of a risk function include the mean squared error loss function (e.g., $L(a)=a^2$) or any other appropriate function. The original hierarchy would have the lowest risk. Performing any operation to condense the original hierarchy may increase the risk (e.g., increase the loss of information).

In some examples, hierarchy condensation module 28 may condense the hierarchy by determining an increase in risk that would result from performing operations on the original hierarchy and performing the operation that would result in the least increase in risk. For instance, hierarchy condensation module 28 may determine the increase in risk that would result from creating or modifying a grouping of the sibling nodes for each set of sibling nodes in the hierarchy. Hierarchy condensation module 28 may then perform the operation (e.g., create a grouping of a set of sibling nodes) that would result in the least amount of risk increase, thereby modifying the original hierarchy. Hierarchy condensation module 28 may continue this process (e.g., assessing the risk of possible operations and performing the operation corresponding to the least amount of risk increase) to further condense the hierarchy. That is, hierarchy condensation module 28 would increase the risk and condense the hierarchy with each operation performed. In other examples, hierarchy condensation module 28 may initially condense the original hierarchy down to a single node. Then, hierarchy condensation module 28 may use the risk function to determine the decrease in risk that would result from performing operations on the maximally condensed hierarchy and perform the operation that would result in the most amount of risk decrease. That is, hierarchy condensation module 28 may fully condense the hierarchy then perform one or more operations (e.g., groupings) to reduce the risk of the resulting hierarchy.

In either case, hierarchy condensation module 28 may continue to perform operations (e.g., assessing the risk increase or decrease of each possible operation and performing the operation that gives the best risk outcome) until a stopping criterion is encountered. Example stopping criteria include a threshold level of total risk, a threshold level of incremental risk, a threshold number of operations, a threshold number of nodes, or other criterion. The various stopping criterion may be advantageous in different situations. For instance, for an original hierarchy containing a small number of nodes, it may be advantageous to impose a stopping criterion indicating a threshold number of nodes, as a hierarchy having only minimal condensation may still be easily understood. In another example, such as when an original hierarchy is a broad, but relatively shallow hierarchy (e.g., having numerous nodes at higher levels of the hierarchy but few nodes at lower levels), it may be advantageous to impose a stopping criterion indicating a threshold level of incremental risk, such that operations are only performed as long as the change in risk resulting from the operation does not exceed the threshold.

In the example of FIG. 3, the stopping criterion may be a threshold level of total risk. Hierarchy condensation module 28 may keep track of the total risk of the entire modified hierarchy as hierarchy condensation module 28 performs each operation. When the next least risky operation would increase the total risk beyond the threshold level, hierarchy condensation module 28 may not perform any more operations. That is, hierarchy condensation module 28 may operate on more than one set of sibling nodes at once, determining which operation on which set of sibling nodes would produce the least increase in total hierarchy risk, and stopping when all subsequent operations would increase the total risk beyond the threshold level. In other examples, the stopping criterion may be a threshold level of incremental risk. In such examples, hierarchy condensation module 28 may not perform any operation if the least risky operation involves an increase in risk beyond the threshold level. That is, hierarchy condensation module 28 may operate on each set of sibling nodes independently (e.g., in series or in parallel), and perform operations to condense each set of sibling nodes until performing any operation on the particular set of sibling nodes would increase the risk by more than the threshold level of incremental risk. In yet other examples, the stopping criterion may be a threshold number of nodes in the hierarchy, or other criterion.

Hierarchy condensation module 28 may, in some examples, perform an operation to remove a complete set of sibling nodes from the hierarchy. For instance, when all sibling nodes in a set are sufficiently similar, it is likely unnecessary to display each of the individual sibling nodes in the hierarchy. Instead, the set of sibling nodes may be adequately represented by a parent node of the set. Thus, hierarchy condensation module 28 may remove the entire set of sibling nodes from the hierarchy.

Hierarchy condensation module 28 may remove a set of sibling nodes when two conditions are satisfied. Firstly, hierarchy condensation module 28 may determine whether the grouping of a set of sibling nodes contains only a single group. For instance, hierarchy condensation module 28 may perform one or more operations on a set of sibling nodes within the hierarchy that results in a grouping of the sibling nodes such that all of the sibling nodes are together in a single group. Secondly, hierarchy condensation module 28 may determine whether any sibling nodes of the single group are, in turn, the parent to one or more child nodes that cannot be represented by the sibling node. Hierarchy members (e.g., child nodes) with a parent that is in the set of sibling nodes must also be removable. That is, if any of the sibling nodes is a parent node to a lower set of sibling nodes, the lower set of sibling nodes must also meet the two conditions for removal.

By ensuring that lower sets of sibling nodes must also be removable, hierarchy condensation module 28 may avoid removing a set of sibling nodes that has children that should not be removed. In various examples, sets of sibling nodes that satisfy the two conditions may be removed at various points throughout the condensation operations. In some examples, hierarchy condensation module 28 may determine whether any set of sibling nodes in the hierarchy meets the conditions for removal after each operation. In other examples, hierarchy condensation module 28 may perform operations until encountering a stopping criterion, and then determine whether any set of sibling nodes meets the conditions for removal. In any case, hierarchy condensation module 28 may continue to create and modify groupings for the sets of sibling nodes in the hierarchy until hierarchy condensation module 28 encounters a stopping criterion, and hierarchy condensation module 28 may remove any set of sibling nodes meeting the conditions for removal.

After condensing the hierarchy, hierarchy condensation module 28 may output the condensed hierarchy to report module 30. Report module 30 may generate a report including treemap visualization 52 based on the condensed hierarchy and send the report to UI module 32 for display. UI module 32 may, in turn, cause one or more of output devices 34 to display GUI 50 including treemap visualization 52.

As shown in the example of FIG. 3, treemap visualization 52 contains 11 boxes, corresponding to the sales revenue values for each of the 11 states (e.g., the highest dimension of the data). Three of the 11 state boxes, Arkansas, Washington, and Montana, contain boxes representing the average revenue values of each brand within the respective state (e.g., the middle dimension of the data). That is, for the other states, such as Nevada, hierarchy condensation module 28 may have determined that no further breakdown is required. Of the brand boxes, two contain boxes representing the average revenue values of each style of product within the respective brand, within the respective state (e.g., the lowest dimension of the data). This may be a result of hierarchy condensation module 28 determining that the average values of each style of product are different enough.

In the example of FIG. 3, the size of each box may indicate the total number of sales contributing to the respective average revenue value. That is, the size of each container may indicate the count of measurements (e.g., each individual sale) that the respective node represents. For instance, Colorado (displayed as "COL" in FIG. 3) is represented by a very small box, indicating a small number of sales, while Montana is represented by a very large box, indicating a large number of sales. That is, in viewing the example of FIG. 3, a user may easily see that Montana has about four times the number of shoe sales that Arkansas has. In other examples, the size of each box may indicate a different secondary measure, such as a profit value or any other measure associated with the respective node.

The crosshatching of some boxes, in the example of FIG. 3, may indicate the average revenue value of all sales for the particular dimension. For instance, the crosshatching of the box representing Illinois indicates that Illinois had $100 or more in average revenues, but less than $150. The crosshatching of the box representing Style 1 of Brand 4 products sold in Montana indicates that Montana had $200 or more in average revenues for Brand 4 products of Style 1. In other examples, crosshatching may indicate other primary measures, such as a percentage of votes for a political candidate, number of products, or any other quantity. While crosshatching is used in FIG. 3, other methods of visually differentiating primary measure values may also be used in various examples. For instance, different measure values may be represented by different shadings or colors, different heights in a three dimensional visualization, or other visual indicators.

In treemap visualization 52, the boxes representing the states of Colorado and Washington are shown adjacent to one another. That is, the boxes representing the states of Colorado and Washington are together, visually demarcated from the boxes representing the other states. This may, in the example of FIG. 3, indicate a first group of states having similar average revenue values (e.g., the middle-low average revenue states). Arkansas, Illinois, Maryland, and Virginia are shown in treemap visualization 52 as adjacent to one another in a second group of states (e.g., the medium average revenue states), visually demarcated from other groups of states. The states of New York, Montana, Michigan, Nevada, and California are shown adjacent to one another, indicating a third group of states having similar average revenue values (e.g., the high average revenue states). These visual groupings and visual demarcations may be a result of grouping operations, performed by hierarchy condensation module 28, on the set of sibling nodes at the state level of the hierarchy. That is, hierarchy condensation module 28 may determine the risk increase that would result from performing a grouping operation on the set of sibling nodes representing the 11 states. Hierarchy condensation module 28 may then determine that performing the grouping operations would result in the least amount of risk increase and thus perform the operations. Hierarchy condensation module 28 may continue to perform grouping operations on the set until encountering a stopping criterion. In the example of FIG. 3, for instance, performing further operations (e.g., combining any two of the groups of states) may cause hierarchy condensation module 28 to exceed the threshold amount of total risk. As a result, the condensed hierarchy may have a grouping of the state sibling nodes that contains three separate groups.

In the example of FIG. 3, visual grouping and visual demarcation is shown using spacing between boxes. That is, boxes are visually grouped by being next to one another in the visualization, and groups are visually demarcated from one another by being apart from one another. In other examples, visual demarcation and/or visual grouping may be accomplished in other ways. For example, visual demarcation of groups in a visualization (e.g., a treemap or choropleth visualization) may include use of color, shape, size, height (e.g., in a third dimension), or any other method to indicate separate groups to a user.

In the example of FIG. 3, the boxes in treemap visualization 52 that represent Illinois, Maryland, Virginia, New York, Michigan, Nevada, California and Colorado contain no sub-boxes. This may be a result of hierarchy condensation module 28 removing one or more sets of sibling nodes from the hierarchy. That is, hierarchy condensation module 28 may, in creating the condensed hierarchy, remove the set of sibling nodes representing the four brands in each of Illinois, Maryland, Virginia, New York, Michigan, Nevada, California and Colorado. For instance, hierarchy condensation module 28 may perform one or more operations to group the set of sibling nodes corresponding to the four brands in the state of Illinois. As a result of the operations, hierarchy condensation module 28 may create a grouping of the four sibling nodes in which all four nodes representing the brands are together in a single group. Additionally, for each set of sibling nodes representing the four styles within a particular brand in the state of Illinois, hierarchy condensation module 28 may create a grouping in which the four nodes representing the styles are together in a single group. That is, as a result of operations performed to condense the hierarchy, the node representing Illinois may have a set of child nodes all grouped together in a single group, and each child node may have a set of its own child nodes all grouped together in a single group.

Based on the groupings for each set of sibling nodes within the state of Illinois, condensation module 28 may determine that the set of sibling nodes representing the brands in Illinois can be removed and represented by the set's parent node (e.g., the node representing Illinois). That is, condensation module 28 may determine that the set of sibling nodes representing the four brands in the state of Illinois fulfills the conditions for removing a set of sibling nodes, and thus may remove the set (and all child nodes) from the condensed hierarchy. As a result, the state of Illinois is represented in the example of FIG. 3 by a single box, containing no sub-boxes. By crosshatching the box representing Illinois, treemap visualization 52 may visually indicate to users that average revenues in the state of Illinois are $100 or more, but less than $150. Additionally, by not displaying any sub-boxes within the box representing Illinois, treemap visualization 52 may visually indicate to users that the average revenues for each of the various brands is approximately the same within Illinois (e.g., no brand "sticks out"). Furthermore, not displaying any sub-boxes within the box representing Illinois also indicates to users that the average revenue values for the types of product for each brand sold in the state of Illinois are unlikely to be particularly interesting. That is, because each set of sibling nodes in the Illinois node are similar enough to their respective siblings, there is no need to display all the sets of sibling nodes.

In condensing the original hierarchy, hierarchy condensation module 28 may remove sets of child nodes from Maryland, Virginia, New York, Michigan, Nevada, California, and Colorado as well. That is, the average brand and style revenue values for the states of Illinois, Maryland, Virginia, New York, Michigan, Nevada, California and Colorado may not be deemed "important," because performing one or more grouping operations on the respective sets of sibling nodes does not cause hierarchy condensation module 28 to encounter a stopping criterion. In the example of FIG. 3, for instance, condensing each set of sibling nodes in a respective state (e.g., the set of styles for each brand and the set of brands) to a grouping containing one group of all the sibling nodes may not exceed the threshold amount of total risk for the hierarchy. Thus, hierarchy condensation module 28 may create the groupings. Because the groupings satisfy the conditions for removal, hierarchy condensation module 28 may remove the relevant sets of sibling nodes.

As shown in the example of FIG. 3, the boxes in treemap visualization 52 that represent Arkansas, Montana, and Washington each contain four sub-boxes corresponding to the four brands within the respective state. This may be a result of hierarchy condensation module 28 determining that any further grouping of the brand nodes and/or style nodes would cause hierarchy condensation module 28 to encounter a stopping criterion. For instance, within the box representing Montana, the sub-box representing Brand 3 is not adjacent to any other brand sub-box, indicating a first brand group (e.g., a group of medium average revenues) consisting of only Brand 3. The two sub-boxes representing Brand 1 and Brand 2 are adjacent to one another, indicating a second brand group (e.g., a group of medium-high average revenues) consisting of Brands 1 and 2. Finally, The sub-box representing Brand 4 is not adjacent to any other brand sub-box, indicating a third brand group (e.g., high average revenues) consisting of only Brand 4. That is, hierarchy condensation module 28 may perform operations on the set of four sibling nodes representing the four brands in Montana, and determine a grouping containing three groups. In the example of FIG. 3, performing any further grouping operation on the set (e.g., combining any two of the brand groups) may result in an amount of total risk that exceeds the threshold and thus the operation is not performed. Because the groupings of brand nodes for Montana, Arkansas, and Washington do not fulfill the conditions for removal, hierarchy condensation module 28 may not remove the nodes from the hierarchy.

In treemap visualization 52, the sub-box that represents Brand 4 in Montana contains four sub-boxes corresponding to the four styles for the brand in that state. This may be a result of hierarchy condensation module 28 determining that any further grouping of these style nodes would cause hierarchy condensation module 28 to encounter a stopping criterion. For instance, within the sub-box representing Brand 4 in Montana, the sub-boxes representing Styles 1 and 2 are depicted adjacent to one another, indicating a first style group. The two sub-boxes representing Styles 3 and 4 are also adjacent to one another, indicating a second style group. In the example of FIG. 3, performing any further grouping operation on the set of styles (e.g., combining the two style groups) may result in an amount of total risk that exceeds the threshold and thus the operation is not performed. Because the grouping of the style nodes for Brand 4 in Montana does not fulfill the conditions for removal, hierarchy condensation module 28 may not remove the nodes from the hierarchy.

In accordance with techniques of the present disclosure, hierarchy condensation module 28 may perform one or more operations on a hierarchy representation of hierarchical data in order to create a condensed hierarchy. Hierarchy condensation module 28 may employ objective considerations in determining how and when to perform hierarchy condensation operations. By condensing a hierarchy based on objective criteria, hierarchy condensation module 28 may reduce the hierarchically structured data while retaining the information that may be most relevant or important. Furthermore, by outputting the condensed hierarchy for display (e.g., as part of a treemap visualization, choropleth map visualization, or other visualization), hierarchy condensation module 28 may enable a computing device to provide reports to users that contain hierarchical data in a more easily understandable format.

In some examples, reports 17, displayed as part of a GUI, may be static. That is, the report may be displayed at output devices 34 for viewing by user 12A and, if user 12A desires to change an attribute of the report, user 12A may provide input (e.g., via input devices 36) to cause computing device 16A to generate a new report. In other examples, reports 17 may be interactive. For instance, user 12A may view reports 17 at one of output devices 34, and use one or more of input devices 36 to interact with the report. In some examples, computing device 16A may allow users to interact with a report by changing parameters used in condensing the underlying hierarchical data (e.g., change the risk function used, change the type or value of a stopping criterion, or otherwise modify the report). In the example of FIG. 3, GUI 50 may display treemap 52 as part of an interactive report. As such, GUI 50 includes criterion selector 54 and threshold slider 56.

Criterion selector 54 may enable a user to change the type of stopping criterion used in condensing the hierarchy. For instance, criterion selector 54 may be a dropdown menu that shows possible types of stopping criterion (e.g., total risk, incremental risk, number of nodes, or other criterion). User 12A may select criterion selector 54 to display the menu, and select a specific type of stopping criterion. Responsive to receiving user 12A's selection, computing device 16A may cause hierarchy condensation module 28 to re-condense the original hierarchy, using the new type of stopping criterion.

Threshold slider 56 may enable a user to change a value of the stopping criterion used in condensing the hierarchy. For instance, in the example of FIG. 3, user 12A may move threshold slider 56 to the left or to the right to increase or decrease the threshold value of a stopping criterion such as a total risk. In other examples, moving threshold slider 56 may increase or decrease the value of an incremental risk threshold, a number of nodes threshold, or other type of stopping criterion.

In some examples, a GUI may also include one or more graphical elements allowing user 12A to change the risk function used to condense the original hierarchy underlying the treemap visualization. That is, in various examples, computing device 16A may display elements of a GUI allowing users to change or modify hierarchy condensation, add or remove dimensions from the hierarchy, or perform other operations to gain further insight into the displayed data.

Figure 4:
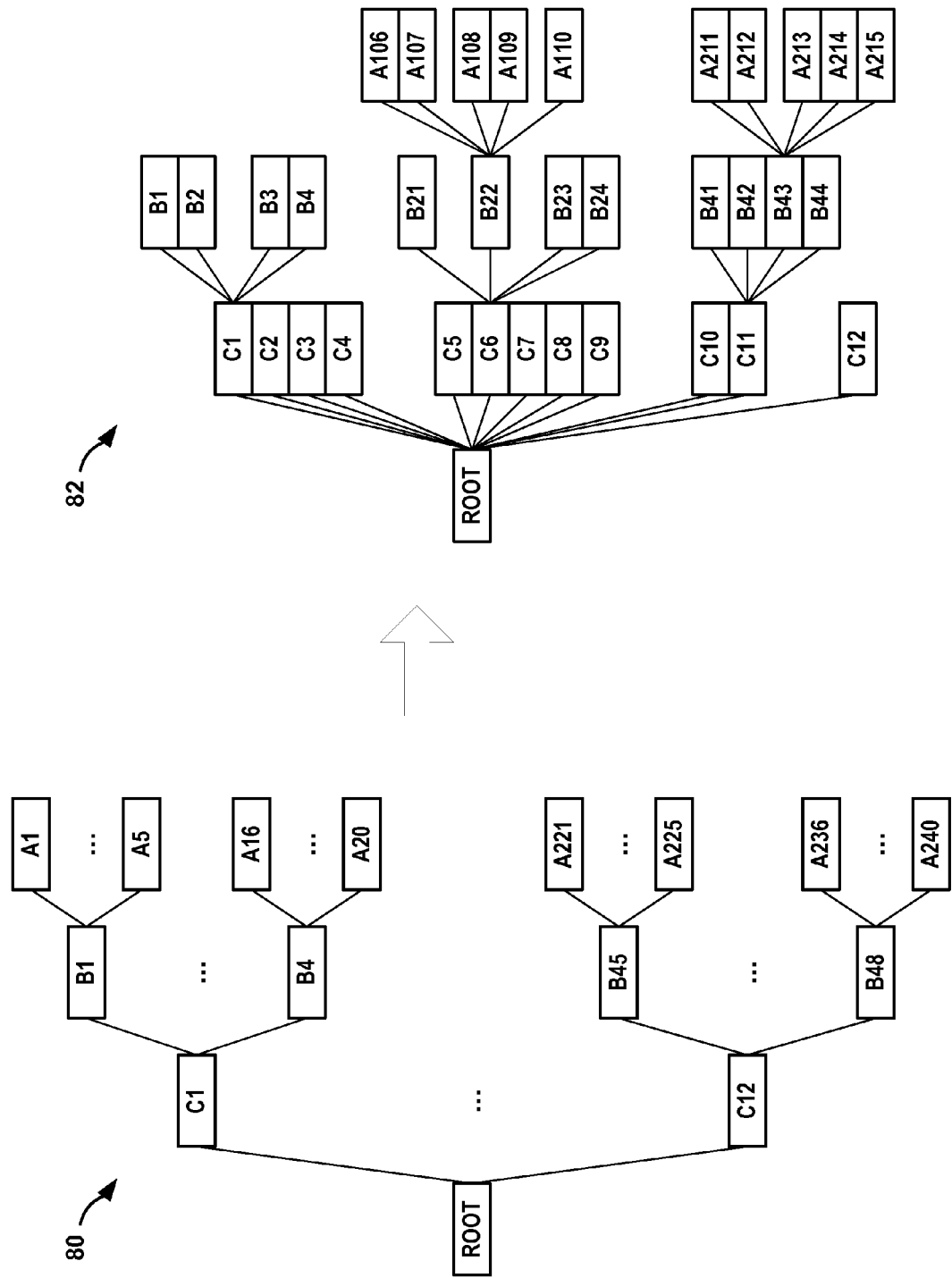
FIG. 4 is a block diagram illustrating an example condensation of hierarchical data, in accordance with one or more aspects of the present disclosure.

FIG. 4 is a block diagram illustrating an example condensation of hierarchical data, in accordance with one or more aspects of the present disclosure. For purposes of illustration, the example shown in FIG. 4 is described in the context of computing device 16A and enterprise business intelligence system 14 as shown in FIGS. 1 and 2.

FIG. 4 includes original hierarchy 80 and condensed hierarchy 82. Original hierarchy 80 illustrates one example of an original hierarchy to be condensed by hierarchy condensation module 28. As shown in the example of FIG. 4, original hierarchy 80 includes a root node containing three levels of hierarchical data represented as nodes. Original hierarchy 80 has no grouping of nodes. Original hierarchy 80 contains a C dimension with 12 nodes, each having 4 child nodes in a B dimension. In turn, each node in the B dimension includes 5 child nodes in an A dimension. Original hierarchy 80 thus contains a total of 301 nodes. For ease of understanding, not all nodes of original hierarchy 80 are shown in the example of FIG. 4. In the example of FIG. 4, all nodes of original hierarchy 80 are labeled differently from one another (e.g., B1 is the only node to have a child node labeled A1). In other examples, hierarchies may have distinct nodes labeled the same (e.g., C1 and C2 may each have a different child node, but both child nodes may be labeled B1). In any case, the measure value of each node of original hierarchy 80 may represent an average, or mean value of measure values for all its child nodes. For instance, the measure value of node B1 may represent the average value of measurements in A1, A2, A3, A4, and A5. The measure value of node C1 may represent the average value of measurements in B1, B2, B3, and B4. The measure value of the root node of original hierarchy 80 may represent the average value of all measurements in the C dimension.

In accordance with one or more techniques of the present disclosure, hierarchy condensation module 28 may perform one or more operations on sets of siblings within original hierarchy 80 to condense the hierarchy and create condensed hierarchy 82. For instance, hierarchy condensation module 28 may perform operations on a set of sibling nodes in the highest level of the hierarchy. At the C dimension of original hierarchy 80, all the nodes (e.g., nodes C1-C12) are siblings. Hierarchy condensation module 28 may collect sibling nodes that have similar measure values into groups, each group containing one or more of the siblings. Condensed hierarchy 82 shows an example grouping, with four groups of siblings in the C dimension. Grouping of sibling nodes in condensed hierarchy 82 is shown by displaying the nodes adjacent to one another. Grouping sibling nodes and the operations performed by hierarchy condensation module 28 to do so are further described with respect to FIGS. 5A and 5B below.

The grouping of the set of siblings in the C dimension as shown in condensed hierarchy 82 may be the state of the set when hierarchy condensation module 28 encounters a stopping criterion. The first group contains nodes C1-C4. The second group contains nodes C5-C9. The third group contains nodes C10 and C11. The fourth group contains only node C12. The mean measure values for the siblings in each of the four groups may be generally homogeneous. That is, as a result of hierarchy condensation module 28 performing one or more grouping operations on the set of siblings C1-C12, each of the sibling nodes may have similar measure values to the other sibling nodes in its group. To further reduce the number of groups (e.g., combining the first group with the second group) may cause hierarchy condensation module 28 to surpass the stopping criterion, and thus the operation may not be performed.

Hierarchy condensation module 28 may, in the example of FIG. 4, perform one or more grouping operations on other sets of sibling nodes in the hierarchy. For instance, in original hierarchy 80, each original node in the C dimension has a set of four children. Hierarchy condensation module 28 may perform one or more operations to create a corresponding grouping for each set of sibling nodes in the B dimension (e.g., each set having a distinct parent node in the C dimension). In some examples, sets of sibling nodes in a dimension may have a parent node that is a part of a group at the next higher dimension. In such case, the corresponding parent node is maintained within its group and its children are expanded at the next lower dimension of the hierarchy accordingly. Therefore, it is unnecessary to remove a parent node from its group based on dissimilarity among its child nodes, since the parent node's measure value is still similar to other members in its group. In the example of FIG. 4, for instance, nodes C1, C6 and C11 are each part of a group of nodes in the C dimension, despite the fact that their respective child nodes are not similar enough to be in a single group.

Hierarchy condensation module 28 may repeat this process of grouping sets of sibling nodes for all the nodes of original hierarchy 80 in the A dimension. For each node in dimension B, the set of child nodes (e.g., in the A dimension) may be divided into groups according to the similarity of respective measure values. That is, in the example of FIG. 4, all the parent nodes in the B dimension are considered for expansion. In some examples, a node in the B dimension may have children nodes that are not condensed, even though the node in the B dimension belongs to a set of sibling nodes that could be condensed to the C dimension. In such instance, hierarchy condensation module 28 may not condense the set of sibling nodes in the B dimension. That is, hierarchy condensation module 28 may maintain the set of sibling nodes in the B dimension (e.g., in a single group) as children of the respective parent node from the C dimension. For instance, nodes A211-A215 are maintained in condensed hierarchy 82, despite the fact that B41-B44 are grouped in a single group.

Hierarchy condensation module 28 may continue this process of grouping and condensing sets of sibling nodes to any lower dimensions of a hierarchy, if available. After every set of sibling nodes has been maximally grouped (e.g., until the stopping criterion is encountered) and those sets meeting the conditions for removal have been removed, hierarchy condensation module 28 may output condensed hierarchy 82 for display. Thus, the hierarchy displayed (e.g., as part of a treemap visualization or choropleth map visualization) may not be a simple tree structure. Instead, the displayed hierarchy (e.g., condensed hierarchy 82) may represent a condensed version of an original hierarchy (e.g., original hierarchy 80), since not all the members are expanded. Moreover, the displayed condensed hierarchy may include visual groupings of sibling nodes belonging to a common direct parent. In this way, hierarchy condensation module 28 enables creation of reports 17 having treemap displays that maintain sibling groups, as well as providing drill-through for the expanded members (and groups) at lower levels.

Figure 5A:
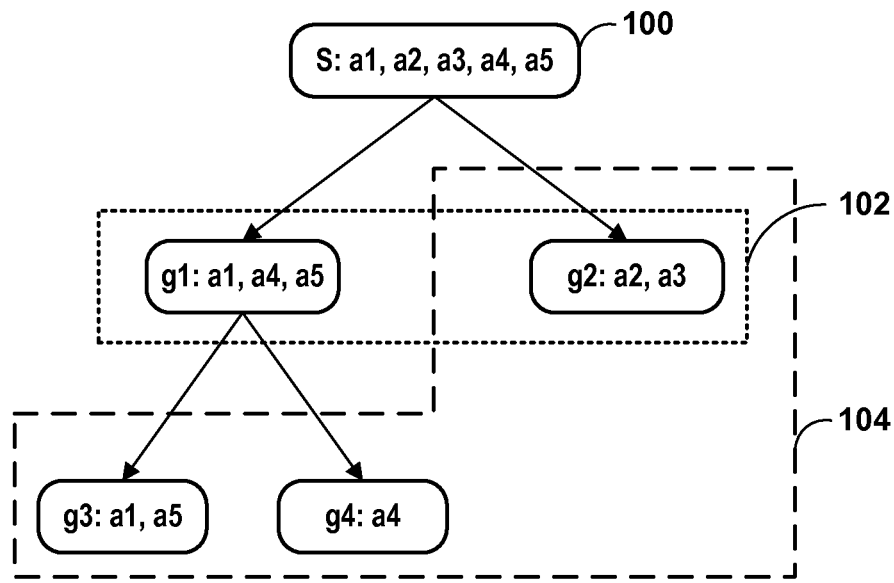
FIGS. 5A and 5B are block diagrams illustrating example grouping of sibling nodes, in accordance with one or more aspects of the present disclosure.
Figure 5B:
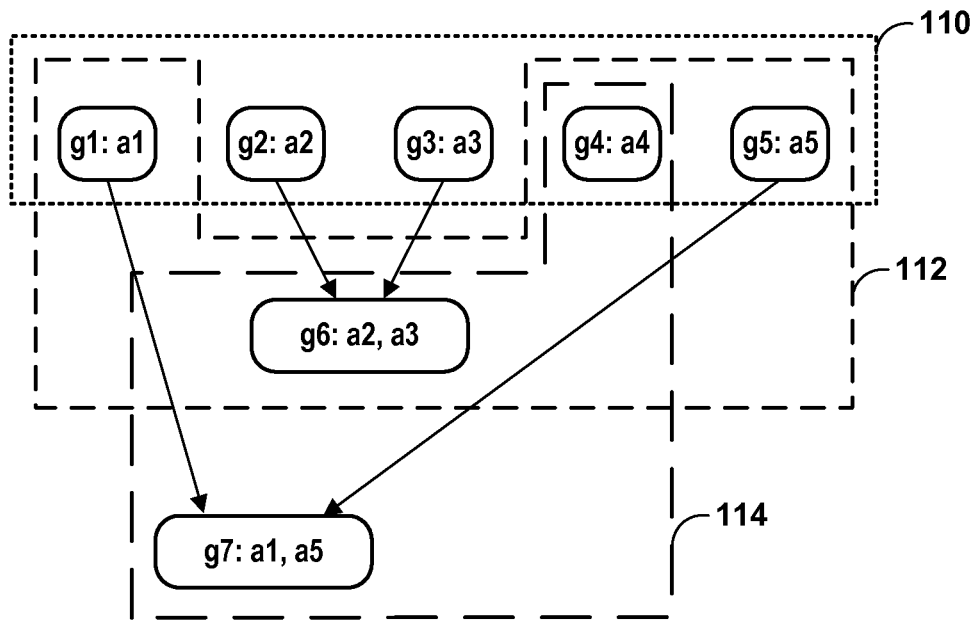

FIGS. 5A and 5B are block diagrams illustrating example grouping of sibling nodes, in accordance with one or more aspects of the present disclosure. For purposes of illustration, the examples shown in FIGS. 5A and 5B are described within the context of computing device 16A and enterprise business intelligence system 14 as shown in FIGS. 1 and 2.

In accordance with one or more techniques of the present disclosure, hierarchy condensation module 28 may condense a hierarchy by performing one or more operations on a set of sibling nodes within the hierarchy. Each operation performed by hierarchy condensation module 28 may create or modify groups of sibling nodes from the set. That is, a set of sibling nodes, S, may be divided into a set of disjoint groups. Each group, $g_n$, in the set of disjoint groups may contain different sibling nodes from S. A collection of groups, such that the union of sibling nodes from all the groups is equal to S, may be referred to as a grouping, G.

In order to condense a hierarchy, hierarchy condensation module 28 may, in some examples, determine one or more groupings for every set of sibling nodes in the hierarchy. Hierarchy condensation module 28 may operate on each set of sibling nodes independently from other sets of sibling nodes. For a given set of sibling nodes, hierarchy condensation module 28 may perform operations to generate a sequence of groupings. Hierarchy condensation module 28 may continue to perform operations until no further operations can be performed on the set, or until hierarchy condensation module 28 encounters a stopping criterion. Encountering a stopping criterion may represent a determination that the set of sibling nodes has been sufficiently condensed.

FIG. 5A shows example groups and groupings for condensing a set of sibling nodes. In some examples, a sequence of condensations is constructed by starting with fully collapsed hierarchy. Thereafter, a single node is split in each step, resulting in sequential condensations with increasing numbers of nodes. That is, hierarchy condensation module 28 may initially perform an operation to maximally condense the set and then expand the set through subsequent operations. In the example of FIG. 5A, for instance, hierarchy condensation module 28 may perform an operation to maximally condense the set of sibling nodes, S, to a single group 100.

After maximally condensing the set of sibling nodes, hierarchy condensation module 28 may employ a risk function to determine the potential decrease in risk that would result from performing various operations on the set. Additionally, hierarchy condensation module 28 may employ various stopping criterion for the sequence of condensations. The resulting hierarchy condensation after encountering a stopping criterion may provide balance between the risk increase of the condensed hierarchy and the size of the condensed hierarchy. In the example of FIG. 5A, after maximally condensing the set of sibling nodes, hierarchy condensation module 28 may determine the risk that would result from the various possible ways of splitting group 100 into two groups. That is, hierarchy condensation module 28 may determine each possible way in which the five nodes of group 100 can be split into two groups, and use a risk function, R, to determine the resulting risk decrease of each possible combination.

The risk for a group, R(g), may be computed for each group based on values of the target measure that correspond to the sibling nodes in the group. In the example of FIG. 5A, the risk for a group may be defined by the equation $$R(g) = \frac{1}{N} \sum_{i \in g} (y_i - \bar{y}_g)^2$$

where $y_i$ is the measure value of each measurement in the group, $\bar{y}_g$ is the mean measure value of all measurements in the group, and N is the number of measurements in the entire hierarchy. When a group g is split into two groups, g' and g", the risk decrease at g may be calculated by determining the change in risk. That is, in the example of FIG. 5A, hierarchy condensation module 28 may calculate the decrease in risk that would result from an operation by determining $\Delta R(g) = R(g) - R(g') - R(g'')$. Thus, any risk decrease resulting from splitting a group depends on the sibling nodes that will be contained in each of the resulting groups. In the example of FIG. 5A, hierarchy condensation module 28 may always divide the sibling nodes of an original group, g, into two groups such that the risk decrease is maximized.

Thus, hierarchy condensation module 28 may determine the change in risk that would result from splitting group 100 into two groups for each of the 15 possible ways in which the five nodes can be placed into two groups. Hierarchy condensation module 28 may determine that the greatest risk decrease can be achieved by splitting group 100 into a first group, $g_1$, that includes a1, a4, and a5, and a second group, $g_2$, that includes a2 and a3. Responsive to determining the operation that would result in the greatest decrease of risk, hierarchy condensation module 28 may perform the corresponding operation. In the example of FIG. 5A, hierarchy condensation module 28 may divide the single group of sibling nodes (e.g., group 100) into groups $g_1$ and $g_2$.

Hierarchy condensation module 28 may continue this process (e.g., assessing the risk decrease that would result from performing various operations and performing the operation having the largest risk decrease) until one of two events occurs: either no more operations can be performed (e.g., each group contains only a single sibling node), or a stopping criterion is encountered. Each group of sibling nodes that has not yet been split by hierarchy condensation module 28 may be part of a current grouping, $G_n$, of the set of sibling nodes. For instance, by splitting group 100 into $g_1$ and $g_2$, hierarchy condensation module 28 may create first grouping 102. In determining a subsequent operation to perform, hierarchy condensation module 28 may, in some examples, choose to split the group of the current grouping that has the highest potential risk decrease. Thus, in the example of FIG. 5A, hierarchy condensation module 28 may determine that performing an operation to split group $g_1$ would result in the highest risk decrease, and thus may split group $g_1$ into group $g_3$, containing nodes a1 and a5, and group $g_4$, containing node a4. In this way, hierarchy condensation module 28 may create second grouping 104 (e.g., including groups $g_2$, $g_3$, and $g_4$).

The risk for a grouping, G, may be determined by calculating the risk of each group, g, in the grouping. That is, $$R(G) = \sum_{g \in G} R(g).$$

The risk decrease from a subsequent grouping may be defined as the change in risk between the two groupings. That is, $\Delta R(G_i) = R(G_{i-1}) - R(G_i)$.

After each operation performed by hierarchy condensation module 28 (e.g. splitting a group into two groups), subsequent groupings will result, such as $G_0$, $G_1$, $G_2$, ..., $G_r$. In the example of FIG. 5A, $G_0$ may correspond to group 100. $G_r$ may represent a final grouping obtained when a stopping criterion has been encountered. For instance, the stopping criterion, r, may be a threshold level of incremental risk decrease, $\Delta R(G_r)$. In such instance, when hierarchy condensation module 28 determines that an operation that will result in the largest amount of risk decrease will result in a risk decrease that is lower than r, hierarchy condensation module 28 may not perform the operation. In other words, splitting a single group from a current grouping into two groups in a subsequent grouping using a risk function R may ensure that the risk decrease, becomes smaller for each new group created. Accordingly, the incremental risk decrease, $\Delta R(g)$, becomes smaller for each new grouping created. Therefore $G_r$ can be defined as the last grouping in the sequence because the change in risk for $G_r$, $\Delta R(G_r)$, would be the last risk decrease that is greater than or equal to the threshold level of incremental risk, r. Performing a subsequent operation on the grouping would result in a risk decrease that is less than r. Once a stopping criterion is encountered, hierarchy condensation module 28 may determine that the current grouping (e.g., second grouping 104) represents a sufficiently condensed version of the set of sibling nodes. In such instance, hierarchy condensation module 28 may move on to a next set of sibling nodes in the original hierarchy, or perform other operations in accordance with one or more techniques of the present disclosure.

The process of FIG. 5A can be described in the context of a tree structure where each node represents a group of siblings. That is, for a given set of siblings, S, hierarchy condensation module 28 may create a sequence of groupings starting with all the siblings as a single group S. The set S may then be divided into two smaller groups and the process may continue in order as described until an objective criterion is met or each group contains only a single member from S. As shown in FIG. 5A, the tree root node S contains all the siblings, while each other node of the tree contains a group, g, with one or more different siblings from S. The set of siblings $S = \{a_1, a_2, a_3, a_4, a_5\}$ is first split into groups $g_1$ and $g_2$ creating a first grouping $G_1 = \{g_1, g_2\}$. The group $g_1$ is further split into groups $g_3$ and $g_4$ creating final grouping $G_2 = \{g_2, g_3, g_4\}$.

Hierarchy condensation module 28 may perform similar operations for each set of siblings $S^{(k)}$, k=1, ... K in a given hierarchy, H. Given a threshold level of incremental risk decrease, r, hierarchy condensation module 28 may determine a grouping $G_r^{(k)}$ for each set of siblings $S^{(k)}$. The resulting groupings may define the hierarchy condensation, $H_r$. Based on the properties of the constructed groupings $G_r^{(k)}$, splitting any groups of siblings in the condensed hierarchy $H_r$ would decrease the risk by less than r. Thus, the risk function and threshold level of incremental risk provide one example of objective criterion for selecting the hierarchy condensation operations.

The total risk for an original hierarchy, R(H) can be represented by the sum of the risks for each and every "leaf member" m∈L of the hierarchy H. That is, $$R(H) = \frac{1}{N} \sum_{m \in L} \sum_{i \in m} (y_i - \bar{y}_m)^2$$

where L is the set of all terminal members of H and N is the number of measurement values $y_t$ in the hierarchy.

In the maximal hierarchy condensation, $H_0$, a grouping for each set of siblings, $S^{(k)}$, contains only the root node (e.g., $G_0^{(k)} = \{S^{(k)}\}$, k=1, ..., K). This is the root of the hierarchical tree structure. The total risk, R ($H_0$), for the maximally condensed hierarchy is the average of the squared mean differences for all the measure values in the hierarchy. That is, $$R(H_0) = \frac{1}{N} \sum_{i \in H} (y_i - \bar{y}_H)^2$$

where $y_i$ are the measure values for the hierarchy H and $\bar{y}_H$ is their mean.

The hierarchy condensation, $H_r$, contains groupings $G_r^{(k)}$ rather than $G_0^{(k)}$. The total risk, $R(H_r)$ can be computed by subtracting the corresponding differences from $R(H_0)$. Thus, $$R(H_r) = R(H_0) - \sum_k (R[(G)]_o^{(k)}) - R(G_r^{(k)}))$$

where $G_0^{(k)} = \{S^{(k)}\}$ and $G_r^{(k)}$ are the initial and the final groupings of $S^{(k)}$.

The process of generating a condensed hierarchy, $H_r$, in some examples, depends on the threshold level of risk r. A smaller threshold generates a larger condensed hierarchy. An appropriate threshold can be selected directly as an acceptable lower limit for the risk increase in the hierarchy condensation step. Alternatively, the number of members in the condensed hierarchy can be specified and the risk threshold can be adjusted accordingly. Yet another possible condition would be to limit the total risk percentage increase due to hierarchy condensation. These and other similar criteria can be applied using a complete sequence of relevant risk thresholds and corresponding hierarchy condensations.

For instance, the maximally condensed hierarchy, $H_0$, may have every set of siblings, $S^{(k)}$, k=1, ..., K, condensed to a single group. The highest relevant risk threshold, can be obtained by starting the process of grouping for each set of siblings. The highest threshold corresponds to the maximal risk decrease among all the grouping tree root nodes. Once the corresponding root node is split, the next highest threshold, $r_2$, can be determined as the maximal risk decrease among all the current nodes available for splitting. Continuing this process until all nodes are split may result in a complete sequence of thresholds $r_1 \geq \ldots \geq r_n$ for the hierarchy H as well as the matching sequence of hierarchy condensations, $H_0 < H_1 < \ldots < H_n = H$. Each hierarchy condensation $H_j$ has the risk threshold $r_j$ that corresponds to the risk decrease from the previous hierarchy condensation in the sequence. That is, $r_j = R(H_{j-1}) - R(H_j)$.

Growing the binary tree structures and constructing the sequences of groupings may be performed independently with respect to different sets of siblings $S^{(k)}$. Independent performance allows for parallel processing of all sets of siblings in large hierarchies. The subsequent step of creating the complete sequence of risk thresholds for the hierarchy as well as the corresponding sequence of hierarchy condensations is more straightforward and can be executed in a single process after collecting the results from parallel processing.

FIG. 5B shows another example of groups and groupings for condensing a set of sibling nodes. In some examples, in order to condense the set of sibling nodes, hierarchy condensation module 28 may not initially perform an operation to maximally condense the set. Instead, hierarchy condensation module 28 may use the set of sibling nodes from the original hierarchy, and condense the set through subsequent operations. In the example of FIG. 5B, for instance, an original hierarchy may include a set of sibling nodes, and hierarchy condensation module 28 may place each node in its own group. That is, hierarchy condensation module 28 may create groups $g_1$, $g_2$, $g_3$, $g_4$, and $g_5$ and place a sibling node in each group to create first grouping 110 as shown in FIG. 5B.

Hierarchy condensation module 28 may employ a risk function to determine the potential change in risk that would result from performing various operations on the set. In some examples, the risk function may be the same as the risk function, R, used in FIG. 5A. In other examples, the risk function may be different. In any case, using the risk function, hierarchy condensation module 28 may determine the increase in risk that would result from the various possible ways of combining two groups into a single group. That is, hierarchy condensation module 28 may, in the example of FIG. 5B, determine each possible way for any two of the five groups from first grouping 110 to be combined into a single group, and use a risk function, R, to determine the resulting risk of each possible combination.

After determining the potential increase in risk that would result from performing operations to combine each possible pair of groups in first grouping 110, hierarchy condensation module 28 may perform the operation that would result in the smallest risk increase. In the example of FIG. 5B, for instance, hierarchy condensation module 28 may determine that combining groups $g_2$ and $g_3$ would result in the least amount of risk increase. Hierarchy condensation module 28 may determine that the risk of a group containing nodes a2 and a3 is lower than the risk of a group containing any other two nodes from the set of sibling nodes. Thus, the risk increase from performing an operation on first grouping 110 is the risk of the newly-created group, $g_6$ minus the risk for groups $g_2$ and $g_3$.

Performing an operation to create group $g_6$ may result in a second grouping of the sibling nodes, second grouping 112. The second grouping may include the newly-created group, as well as those groups from the previous grouping that were not merged. This process of assessing the risk increase that would result from merging two groups of the current grouping, and merging the two groups that would result in the least amount of risk increase may continue until only a single group remains or until a stopping criterion is encountered. Thus, in the example of FIG. 5B, hierarchy condensation module 28 may determine the increase in risk that would result performing an operation to merge any two of groups $g_1$, $g_4$, $g_5$, and $g_6$. Hierarchy condensation module 28 may determine that an operation to merge groups $g_1$ and $g_5$ would result in the least amount of increased risk. Therefore, hierarchy condensation module 28 may perform the operation and create a new group, $g_7$. By creating the new group, hierarchy condensation module 28 may define a new grouping, third grouping 114, with $g_7$ replacing $g_1$ and $g_5$. Hierarchy condensation module 28 may determine the risk of combining any two of the three groups in third grouping 114 and determine that any combination would cause hierarchy condensation module 28 to encounter a stopping criterion. Therefore, hierarchy condensation module 28 may determine that third grouping 114 represents a sufficiently condensed version of the set of sibling nodes.

After determining that a set of sibling nodes has been sufficiently condensed, hierarchy condensation module 28 may move on to a next set of sibling nodes in the original hierarchy. Hierarchy condensation module 28 may perform one or more operations to condense the next set of sibling nodes as described. In some examples, such as when hierarchy condensation module 28 begins at the lowest level of a hierarchy, hierarchy condensation module 28 may, after condensing a set of sibling nodes, determine whether the set meets the conditions for removal. In other examples, hierarchy condensation module 28 may condense all sets of sibling nodes before determining whether any set meets the conditions for removal.

In some examples, the stopping criterion may be a threshold level of total risk (e.g., throughout the hierarchy). In other examples, the stopping criterion may be an incremental risk threshold. In yet other examples, the stopping criterion may be a number of groups (e.g., 3 groups, 4 groups, or other number) in a grouping. In further examples, the stopping criterion may be a number of nodes in the overall hierarchy, or in a particular dimension of the hierarchy. In some examples, hierarchy condensation module 28 may employ more than one stopping criterion. That is, hierarchy condensation module 28 may monitor two criteria (e.g., a risk threshold and a number of groups in the grouping) and may cease performing operations on a set of sibling nodes when either of the stopping criteria is encountered.

In any case, hierarchy condensation module 28 of computing device 16A may use a risk function, R, and a stopping criterion (e.g., a threshold amount of risk) to perform operations to split or combine groups within a set of sibling nodes, thereby specifying objective criteria for selecting an appropriate grouping for the set. Hierarchy condensation module 28 may apply the same approach and identical threshold to every set of siblings in a given hierarchy in order to select appropriate groupings. The original hierarchy, together with selected groupings for each set of siblings, may define the condensed hierarchy. Hierarchy condensation module 28 may output the condensed hierarchy (e.g., to one or more other components of computing device 16A) for display as part of a treemap visualization, a choropleth map visualization or other visualization. In this way, hierarchy condensation module 28 may enable computing device 16A to provide hierarchal information in an easy to use manner while still allowing the user to view important or interesting information in the hierarchy.

Figure 6:
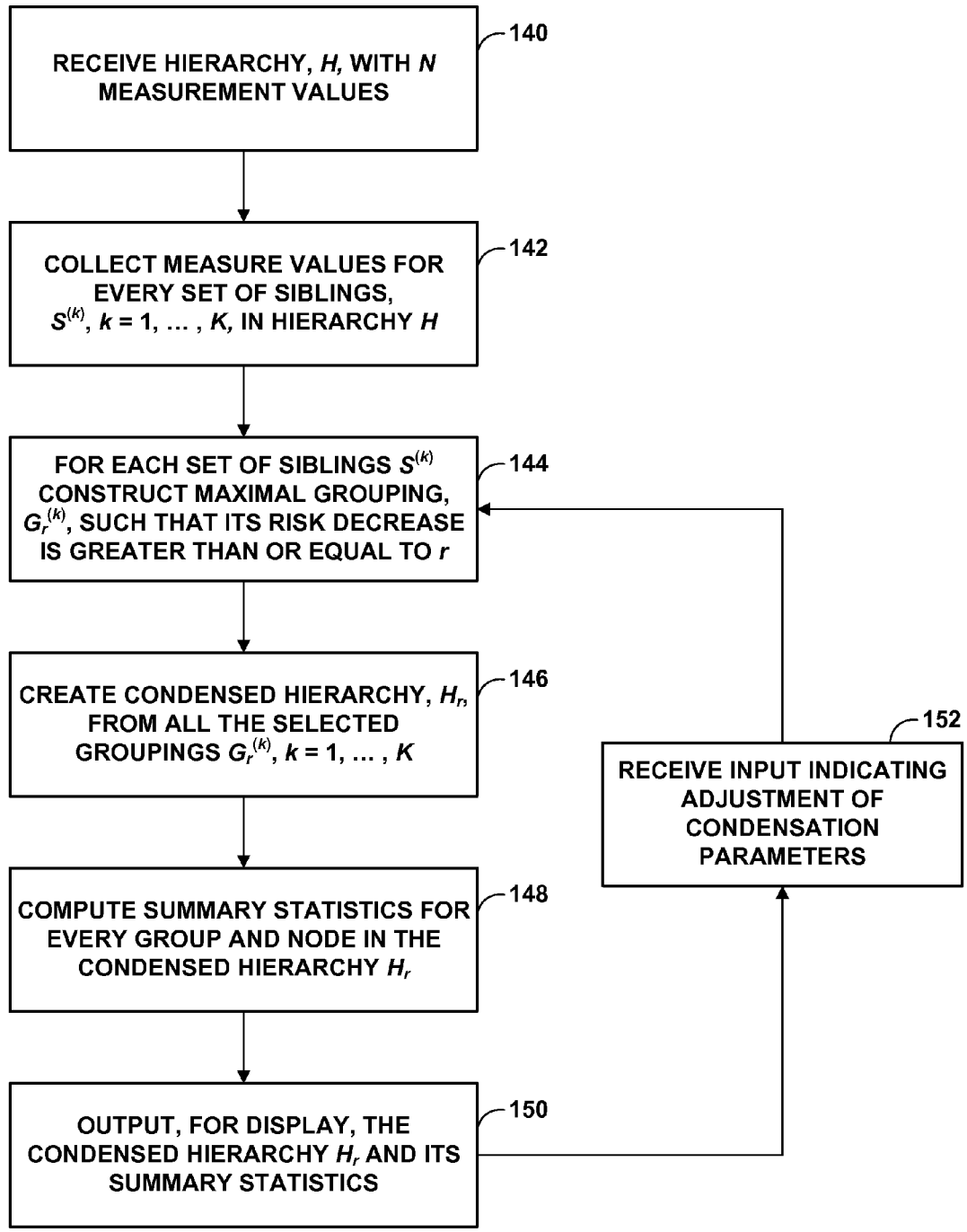
FIG. 6 is a flowchart illustrating example operations for condensing hierarchical data, in accordance with one or more aspects of the present disclosure.

FIG. 6 is a flowchart illustrating example operations for condensing hierarchical data, in accordance with one or more aspects of the present disclosure. For purposes of illustration, the example operations shown in FIG. 6 are described within the context of computing device 16A and enterprise business intelligence system 14 as shown in FIGS. 1 and 2.

In the example of FIG. 6, one or more components of computing device 16A (e.g., hierarchy condensation module 28) may receive hierarchical data representing a hierarchy, H, with N measurement values (140). Hierarchy condensation module 28 may collect measure values for every set of siblings, $S^{(k)}$, k=1, . . . , K in hierarchy H (142). For each set of sibling nodes $S^{(k)}$, hierarchy condensation module 28 may, in the example of FIG. 6, construct a maximal grouping of the sibling nodes, $G_r^{(k)}$, such that the risk decrease of $G_r^{(k)}$ is greater than or equal to a risk threshold value, r (144). Hierarchy condensation module 28 may then create a condensed hierarchy, $H_r$, from all the selected groupings, $G_r^{(k)}$, for k=1, . . . , K (146). Hierarchy condensation module 28 may also compute summary statistics for every group and node in the condensed hierarchy, $H_r$ (148). After creating the condensed hierarchy, hierarchy condensation module 28 may output the condensed hierarchy, $H_r$, and its summary statistics, for display (150). One or more components of computing device 16A (e.g., input devices 36) may receive input indicating an adjustment of one or more condensation parameters, such as the type of stopping criterion, the risk threshold, r, the type of risk function, or other parameters (152). Responsive to receiving the input, hierarchy condensation module may use the original hierarchy to create a new condensed hierarchy, and output the new condensed hierarchy for display.

Figure 7:
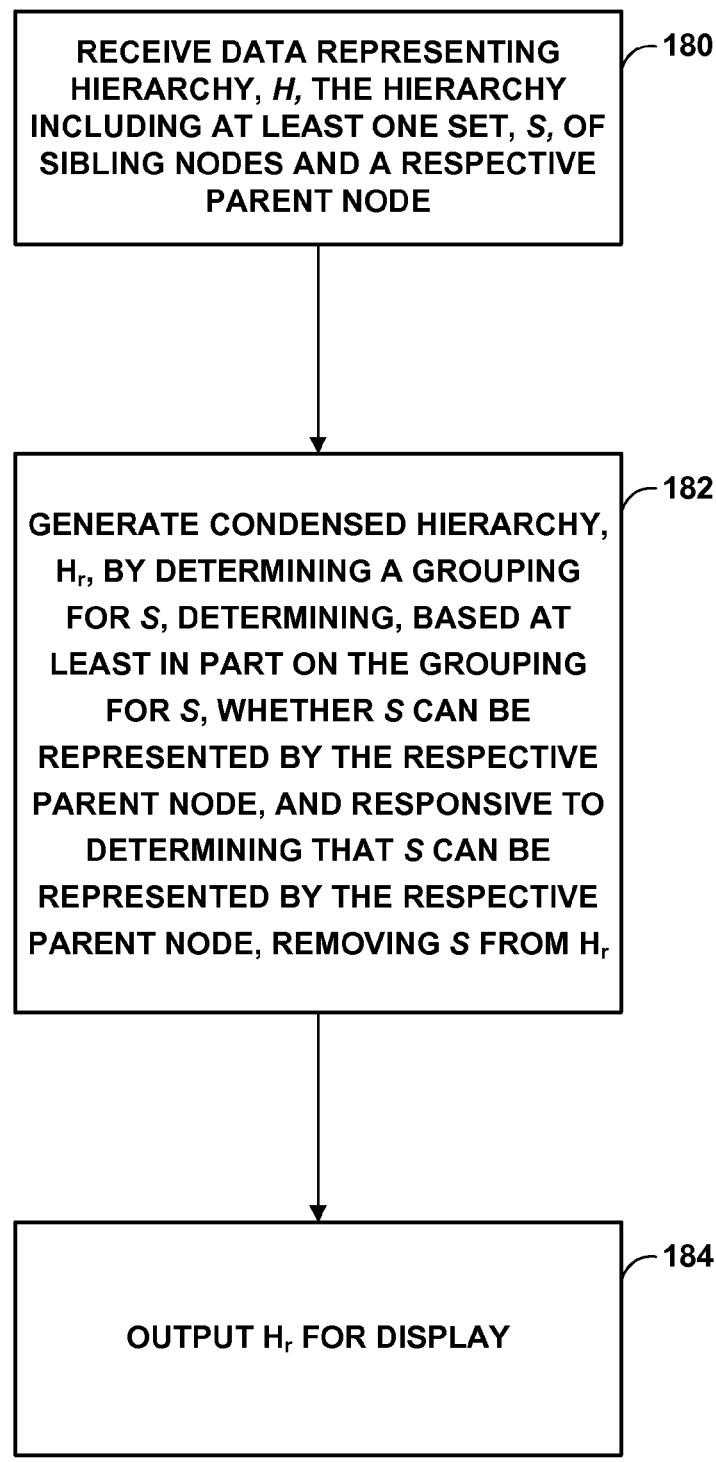
FIG. 7 is a flowchart illustrating example operations for condensing hierarchical data, in accordance with one or more aspects of the present disclosure.

FIG. 7 is a flowchart illustrating example operations for condensing hierarchical data, in accordance with one or more aspects of the present disclosure. For purposes of illustration, the example operations shown in FIG. 7 are described within the context of computing device 16A and enterprise business intelligence system 14 as shown in FIGS. 1 and 2.

In the example of FIG. 7, one or more components of computing device 16A (e.g., hierarchy condensation module 28) may receive data representing a hierarchy, H (180) containing a set of N measurements $y_r$. The hierarchy may include at least one set, S, of sibling nodes, as well as a respective parent node. Hierarchy condensation module 28 may generate a condensed hierarchy, $H_r$, by determining a grouping for the at least one set of sibling nodes, determining, based at least in part on the grouping for the at least one set of sibling nodes, whether the at least one set of sibling nodes can be represented by the respective parent node, and responsive to determining that the at least one set of sibling nodes can be represented by the respective parent node, removing the at least one set of sibling nodes from the condensed hierarchy (182). Hierarchy condensation module 28 may output the condensed hierarchy, $H_r$, for display.

In some examples, determining whether the at least one set of sibling nodes can be represented by the respective parent node comprises determining whether the grouping for the at least one set of sibling nodes consists of a group of sibling nodes that includes each sibling node in the at least one set of sibling nodes, and determining whether the group of sibling nodes includes a sibling node having one or more child nodes that cannot be represented by the sibling node, and determining that the at least one set of sibling nodes can be represented by the respective parent node comprises determining (i) that the grouping for the at least one set of sibling nodes consists of the group of sibling nodes and (ii) that the group of sibling nodes does not include the sibling node having the one or more child nodes.

In some examples, determining the grouping for the at least one set of sibling nodes comprises creating a first grouping for the at least one set of sibling nodes, wherein the first grouping comprises a first group that includes each sibling node from the at least one set of sibling nodes, and wherein the first grouping is associated with a first risk determined based at least in part on a risk function, determining whether a stopping criterion has been encountered, responsive to determining that the stopping criterion has not been encountered, determining whether one or more potential groupings exist, wherein each potential grouping of the one or more potential groupings is associated with a respective second risk determined based at least in part on the risk function, wherein each potential grouping of the one or more potential groupings comprises a respective second group and a respective third group, and wherein a union of the respective second group and the third group contains each sibling node in the first group, and responsive to determining that the one or more potential groupings exist, selecting, as a second grouping, a particular potential grouping of the one or more potential groupings such that a difference in risk between the first risk and the respective second risk associated with the particular potential grouping is greater than or equal to each of respective differences in risk between the first risk and the respective second risks associated with any potential groupings of the one or more potential groupings that are not the particular potential grouping. In some examples, determining the grouping for the at least one set of sibling nodes further comprises determining, based at least in part on the risk function, one or more subsequent groupings until the stopping criterion is encountered. In some examples, the risk function comprises a mean squared error loss function.

In some examples, determining the grouping for the at least one set of sibling nodes comprises creating a first grouping for the at least one set of sibling nodes, wherein the first grouping comprises respective groups of sibling nodes from the at least one set of sibling nodes, and wherein the first grouping is associated with a first risk determined based at least in part on a risk function, determining whether the first grouping has caused a stopping criterion to be encountered, responsive to determining that the stopping criterion has not been encountered, determining whether one or more potential groupings exist, wherein each potential grouping of the one or more potential groupings is associated with a respective second risk determined based at least in part on the risk function, wherein each potential grouping of the one or more potential groupings comprises a respective third group, and wherein the respective third group contains each sibling node in a first group of the respective groups and each sibling node in a second group of the respective groups, and responsive to determining that the one or more potential groupings exist, selecting, as a second grouping, a particular potential grouping of the one or more potential groupings such that a difference in risk between the second risk associated with the particular potential grouping and the first risk is smaller than or equal to each of respective differences in risk between the first risk and the respective second risks associated with any potential groupings of the one or more potential groupings that are not the particular potential grouping. In some examples, determining the grouping for the at least one set of sibling nodes further comprises determining, based at least in part on the risk function, one or more subsequent groupings until the stopping criterion is encountered. In some examples, outputting the condensed hierarchy for display comprises outputting a treemap visualization of the condensed hierarchy.

In some examples, determining the grouping for the at least one set of sibling nodes comprises determining a plurality of groups of sibling nodes, each group of sibling nodes from the plurality of groups of sibling nodes including respective one or more sibling nodes, and outputting the treemap visualization comprises outputting graphical representations of the respective one or more sibling nodes in a first group of sibling nodes from the plurality of groups of sibling nodes in a manner that is visually demarcated from graphical representations of the respective one or more sibling nodes in groups of sibling nodes from the plurality of groups of sibling nodes other than the first group. In some examples, determining the grouping for the at least one set of sibling nodes comprises determining the grouping based at least in part on a risk function, a type of stopping criterion, and a value of the stopping criterion, the method further comprises receiving input indicating a modification of at least one of the risk function, the type of stopping criterion, and the value of the stopping criterion, generating, by the computing system, and based at least in part on the received input, an updated condensed hierarchy, and outputting, by the computing system, the updated condensed hierarchy for display. In some examples, outputting the condensed hierarchy for display comprises outputting a choropleth map visualization of the condensed hierarchy.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various examples have been described. These and other examples are within the scope of the following claims.

The invention claimed is:

1. A method comprising:
receiving data representing a hierarchy, wherein the hierarchy comprises at least one set of sibling nodes and a respective parent node;
generating, by a computing system comprising at least one processor, a condensed hierarchy, wherein generating the condensed hierarchy comprises:
determining a grouping for the at least one set of sibling nodes;
determining, based at least in part on the grouping for the at least one set of sibling nodes and based on one or more hierarchy condensation criteria, whether the at least one set of sibling nodes can be represented by the respective parent node, wherein the one or more hierarchy condensation criteria comprises a determination of risk; and
responsive to determining that the at least one set of sibling nodes can be represented by the respective parent node, removing the at least one set of sibling nodes from the condensed hierarchy based at least in part on the determination of risk; and
outputting, by the computing system, the condensed hierarchy for display.

2. The method of claim 1, wherein determining whether the at least one set of sibling nodes can be represented by the respective parent node comprises:
determining whether the grouping for the at least one set of sibling nodes consists of a group of sibling nodes that includes each sibling node in the at least one set of sibling nodes; and
determining whether the group of sibling nodes includes a sibling node having one or more child nodes that cannot be represented by the sibling node,
wherein determining that the at least one set of sibling nodes can be represented by the respective parent node comprises determining (i) that the grouping for the at least one set of sibling nodes consists of the group of sibling nodes and (ii) that the group of sibling nodes does not include the sibling node having the one or more child nodes.

3. A method comprising:
receiving data representing a hierarchy, wherein the hierarchy comprises at least one set of sibling nodes and a respective parent node;
generating, by a computing system comprising at least one processor, a condensed hierarchy, wherein generating the condensed hierarchy comprises:
determining a grouping for the at least one set of sibling nodes;
determining, based at least in part on the grouping for the at least one set of sibling nodes, whether the at least one set of sibling nodes can be represented by the respective parent node; and
responsive to determining that the at least one set of sibling nodes can be represented by the respective parent node, removing the at least one set of sibling nodes from the condensed hierarchy; and
outputting, by the computing system, the condensed hierarchy for display, wherein determining the grouping for the at least one set of sibling nodes comprises:
creating a first grouping for the at least one set of sibling nodes, wherein the first grouping comprises a first group that includes each sibling node from the at least one set of sibling nodes, and wherein the first grouping is associated with a first risk determined based at least in part on a risk function;
determining whether a stopping criterion has been encountered;
responsive to determining that the stopping criterion has not been encountered, determining whether one or more potential groupings exist, wherein each potential grouping of the one or more potential groupings is associated with a respective second risk determined based at least in part on the risk function, wherein each potential grouping of the one or more potential groupings comprises a respective second group and a respective third group, and wherein a union of the respective second group and the third group contains each sibling node in the first group; and responsive to determining that the one or more potential groupings exist, selecting, as a second grouping, a particular potential grouping of the one or more potential groupings such that a difference in risk between the first risk and the respective second risk associated with the particular potential grouping is greater than or equal to each of respective differences in risk between the first risk and the respective second risks associated with any potential groupings of the one or more potential groupings that are not the particular potential grouping.

4. The method of claim 3, wherein determining the grouping for the at least one set of sibling nodes further comprises determining, based at least in part on the risk function, one or more subsequent groupings until the stopping criterion is encountered.

5. The method of claim 3, wherein the risk function comprises a mean squared error loss function.

6. A method comprising:
receiving data representing a hierarchy, wherein the hierarchy comprises at least one set of sibling nodes and a respective parent node;
generating, by a computing system comprising at least one processor, a condensed hierarchy, wherein generating the condensed hierarchy comprises:
determining a grouping for the at least one set of sibling nodes;
determining, based at least in part on the grouping for the at least one set of sibling nodes, whether the at least one set of sibling nodes can be represented by the respective parent node; and
responsive to determining that the at least one set of sibling nodes can be represented by the respective parent node, removing the at least one set of sibling nodes from the condensed hierarchy; and
outputting, by the computing system, the condensed hierarchy for display,
wherein determining the grouping for the at least one set of sibling nodes comprises:
creating a first grouping for the at least one set of sibling nodes, wherein the first grouping comprises respective groups of sibling nodes from the at least one set of sibling nodes, and wherein the first grouping is associated with a first risk determined based at least in part on a risk function;
determining whether the first grouping has caused a stopping criterion to be encountered;
responsive to determining that the stopping criterion has not been encountered, determining whether one or more potential groupings exist, wherein each potential grouping of the one or more potential groupings is associated with a respective second risk determined based at least in part on the risk function, wherein each potential grouping of the one or more potential groupings comprises a respective third group, and wherein the respective third group contains each sibling node in a first group of the respective groups and each sibling node in a second group of the respective groups; and responsive to determining that the one or more potential groupings exist, selecting, as a second grouping, a particular potential grouping of the one or more potential groupings such that a difference in risk between the second risk associated with the particular potential grouping and the first risk is smaller than or equal to each of respective differences in risk between the first risk and the respective second risks associated with any potential groupings of the one or more potential groupings that are not the particular potential grouping.

7. The method of claim 6, wherein determining the grouping for the at least one set of sibling nodes further comprises determining, based at least in part on the risk function, one or more subsequent groupings until the stopping criterion is encountered.

8. The method of claim 6, wherein outputting the condensed hierarchy for display comprises outputting a treemap visualization of the condensed hierarchy.

9. The method of claim 8,
wherein determining the grouping for the at least one set of sibling nodes comprises determining a plurality of groups of sibling nodes, each group of sibling nodes from the plurality of groups of sibling nodes including respective one or more sibling nodes, and
wherein outputting the treemap visualization comprises outputting graphical representations of the respective one or more sibling nodes in a first group of sibling nodes from the plurality of groups of sibling nodes in a manner that is visually demarcated from graphical representations of the respective one or more sibling nodes in groups of sibling nodes from the plurality of groups of sibling nodes other than the first group.

10. The method of claim 8, wherein determining the grouping for the at least one set of sibling nodes comprises determining the grouping based at least in part on a risk function, a type of stopping criterion, and a value of the stopping criterion, the method further comprising:
receiving input indicating a modification of at least one of the risk function, the type of stopping criterion, and the value of the stopping criterion;
generating, by the computing system, and based at least in part on the received input, an updated condensed hierarchy; and
outputting, by the computing system, the updated condensed hierarchy for display.

11. The method of claim 1, wherein outputting the condensed hierarchy for display comprises outputting a choropleth map visualization of the condensed hierarchy.

12. The method of claim 3, wherein outputting the condensed hierarchy for display comprises outputting a treemap visualization of the condensed hierarchy.

13. The method of claim 3, wherein outputting the condensed hierarchy for display comprises outputting a choropleth map visualization of the condensed hierarchy.

14. The method of claim 6, wherein outputting the condensed hierarchy for display comprises outputting a choropleth map visualization of the condensed hierarchy.

* * * * *